(12) United States Patent
Nakashiba et al.

(10) Patent No.: US 9,008,480 B2
(45) Date of Patent: Apr. 14, 2015

(54) METHOD OF MANUFACTURING OPTICAL WAVEGUIDE CORE, METHOD OF MANUFACTURING OPTICAL WAVEGUIDE, OPTICAL WAVEGUIDE, AND OPTOELECTRIC COMPOSITE WIRING BOARD

(75) Inventors: Tohru Nakashiba, Osaka (JP); Shinji Hashimoto, Kadoma (JP); Naoyuki Kondou, Sakai (JP); Junko Yashiro, Hirakata (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 109 days.

(21) Appl. No.: 13/258,598

(22) PCT Filed: Mar. 26, 2010

(86) PCT No.: PCT/JP2010/056044
§ 371 (c)(1),
(2), (4) Date: Sep. 22, 2011

(87) PCT Pub. No.: WO2010/114109
PCT Pub. Date: Oct. 7, 2010

(65) Prior Publication Data
US 2012/0014640 A1     Jan. 19, 2012

(30) Foreign Application Priority Data

Mar. 31, 2009   (JP) ................................ 2009-087059

(51) Int. Cl.
*G02B 6/10*     (2006.01)
*G03F 7/00*     (2006.01)
(Continued)

(52) U.S. Cl.
CPC .. *G02B 6/13* (2013.01); *G02B 6/43* (2013.01); *G02B 2006/1219* (2013.01)

(58) Field of Classification Search
CPC ........................... G02B 6/13; G02B 2006/1219
See application file for complete search history.

(56) References Cited

U.S. PATENT DOCUMENTS

| 5,054,872 | A | 10/1991 | Fan et al. | |
| 7,653,279 | B1 * | 1/2010 | Jacobsen | ........................ 385/129 |

(Continued)

FOREIGN PATENT DOCUMENTS

| EP | 0 446 672 | 9/1991 |
| JP | 2004-279687 | 10/2004 |

(Continued)

OTHER PUBLICATIONS

Nakashiba et al., "Optical-Electrical Flexible Printed Wiring Board", Matsushita Denko Giho, vol. 54, No. 3 (Sep. 2006), pp. 38-43.

(Continued)

*Primary Examiner* — Omar R Rojas
(74) *Attorney, Agent, or Firm* — Greenblum & Bernstein P.L.C.

(57) ABSTRACT

In order to provide a method of efficiently manufacturing an optical waveguide core having an endface inclined at a predetermined angle, the following method of manufacturing an optical waveguide core is employed. The method includes: a core material layer forming step of forming a core material layer formed of a photosensitive material on a surface of a cladding layer that has been formed on a substrate; a high refractive index substance covering step of covering a surface of the core material layer with a substance having a refractive index higher than 1 by bringing the high refractive index substance into close contact with the core material layer surface; an exposure step of pattern exposing the core material layer in a predetermined core-forming shape to from a core by irradiating the core material layer on a side covered with the high refractive index substance with exposure light inclined at a predetermined angle with respect to the cladding layer surface; a high refractive index substance removing step of removing the high refractive index substance from the surface of the core material layer exposed in the exposure step; and an development step of developing the core material layer from which the high refractive index substance has been removed in the high refractive index substance removing step so as to form the core having an inclined endface.

6 Claims, 9 Drawing Sheets

(51) Int. Cl.
*G02B 6/13* (2006.01)
*G02B 6/43* (2006.01)
*G02B 6/12* (2006.01)

(56) References Cited

U.S. PATENT DOCUMENTS

| 8,155,493 | B2* | 4/2012 | Ushiwata et al. ............. 385/129 |
| 2006/0098933 | A1 | 5/2006 | Shelnut et al. |
| 2008/0305438 | A1 | 12/2008 | Yang et al. |

FOREIGN PATENT DOCUMENTS

| JP | 2008-250099 | 10/2008 |
| TW | 200502606 | 1/2005 |
| TW | 1294258 | 3/2008 |

OTHER PUBLICATIONS

Shioda et al., "45 Degree Micro-Mirror Formed Using Excimer Laser Processing for Polymeric Waveguide", Journal of Japan Institute of Electronics Packaging, vol. 7, No. 7 (2004), pp. 607-612.

"Photoformed Optical Deflector", IBM Technical Disclosure Bulletin, vol. 35, No. 5, (Oct. 1992), pp. 460-462.

Wang et al., "45 Degree Polymer Micromirror Integration for Board-Level Three-Dimensional Optical Interconnects", Optics Express, vol. 17, No. 13 (Jun. 22, 2009), pp. 10514-10521.

* cited by examiner

METHOD OF MANUFACTURING OPTICAL WAVEGUIDE CORE, METHOD OF MANUFACTURING OPTICAL WAVEGUIDE, OPTICAL WAVEGUIDE, AND OPTOELECTRIC COMPOSITE WIRING BOARD

TECHNICAL FIELD

The present invention relates to a method of manufacturing an optical waveguide core, a method of manufacturing an optical waveguide, an optical waveguide manufactured by such an optical waveguide manufacturing method, and an optoelectric composite wiring board having such an optical waveguide.

BACKGROUND ART

Optoelectric composite wiring boards, which are printed circuit boards having build-in optical waveguides, are attracting attention as a way of solving the problems of high-frequency noise and insufficient transmission bandwidth associated with higher signal speeds within various types of information processing devices today.

Optical waveguides with an optical waveguide core having an inclined endface capable of reflecting light are formed in such optoelectric composite wiring boards for, e.g., light input and output from optical waveguides. An example of a method of manufacturing an optical waveguide core having such an inclined endface is the method described in Non-Patent Document 1 below.

Non-Patent Document 1 describes a method of manufacturing an optical waveguide core which includes the steps of forming an optical waveguide core, forming an inclined endface for a mirror on the optical waveguide core by machining the optical waveguide core with a rotary blade or the like, and forming a mirror by depositing a layer of metal on the inclined endface so as to increase the reflection efficiency at the inclined endface.

Non-Patent Document 2 below describes a method wherein an optical waveguide core is formed, following which ablation is carried out by irradiation with an excimer laser from a 45° direction, thereby forming a 45° inclined endface for a mirror.

Patent Document 1 below describes a manufacturing method that includes a manufacturing step wherein light is selectively irradiated onto a photosensitive material layer so as to alter the photosensitive material and thereby form a structure, which manufacturing method includes a step wherein the light is made to enter a substrate at a specific angle. More specifically, it discloses that a waveguide having a 45° mirror can be formed by carrying out, in order: core coating, 45° exposure, and development.

Non-Patent Documents 1 and 2 disclose that an optical waveguide core having an inclined endface can be formed by the above-described manufacturing methods.

At the same time, in the manufacture of optical waveguide cores having an inclined endface, it is desired to increase the manufacturing efficiency by reducing the number of steps required to manufacture an optical waveguide core having an inclined endface in addition to the ability to form an inclined endface. Moreover, there also exists a desire to hold down the manufacturing costs by reducing the number of manufacturing steps.

In the methods described in Non-Patent Documents 1 and 2, following formation of the optical waveguide core, an inclined endface is formed by a cutting operation or the like. That is, formation of the optical waveguide core and formation of the inclined endface are carried out separately, which tends to result in a lower production efficiency and higher production costs than when both are carried out at the same time.

In this connection, Patent Document 1 discloses art which enables the formation of an optical waveguide core and the formation of an inclined endface to be carried out at the same time by having the light at the time of exposure enter a substrate at a specific angle.

CITATION LIST

Patent Literature

Patent Document 1: Japanese Patent Application Laid-open No. 2004-279687
Non-Patent Document 1: "Optoelectric composite flexible printed circuit boards," *Matsushita Denko Giho*, Vol. 54, No. 3 (September 2006)
Non-Patent Document 2: Tsuyoshi Shioda and Kenji Suzuki, "45-Degree micromirror formed in polymer optical waveguide by excimer laser machining," *Journal of Japan Institute of Electronics Packaging*, Vol. 7, No. 7, pp. 607-612 (2004)

SUMMARY OF INVENTION

According to the study of the present inventors, when the light at the time of exposure enters a substrate obliquely as described in Patent Document 1, it will differ considerably from the refractive index of air or the like present at the interface with the core material layer if the refractive index of the core material layer is large. As a result, forming an inclined endface having a specific angle, such as an inclined endface for a 45° mirror, requires that the light during exposure have an angle with respect to the substrate which is small. In cases where the angle of the light to the substrate during exposure is made small, the light sometimes reflects off the surface of the core material layer, making it impossible to form an inclined endface of a predetermined angle. In addition, when the refractive index of the core material layer differs considerably from the refractive index of air, the range in the angle of the light during exposure relative to the cladding layer and the substrate which does not give rise to total reflection of the light becomes narrow. Hence, the range in the angle of the inclined endface that can be formed in an optical waveguide is narrow. That is, there are cases in which an inclined endface of a predetermined angle cannot be formed.

It is therefore an object of the present invention to provide an optical waveguide core manufacturing method which is capable of efficiently manufacturing an optical waveguide core having an inclined endface of a predetermined angle. Further objects of the invention are to provide a method of manufacturing an optical waveguide having an optical waveguide core with an inclined endface, an optical waveguide manufactured by such a manufacturing method, and an optoelectric composite wiring board having such an optical waveguide.

The optical waveguide core manufacturing method according to the invention is a method of manufacturing an optical waveguide core having an inclined endface, the method including: a core material layer forming step of forming a core material layer formed of a photosensitive material on a surface of a cladding layer that has been formed on a substrate; a high refractive index substance covering step of covering a surface of the core material layer with a substance having a refractive index higher than 1 by bringing the high refractive index substance into close contact with the core material layer surface; an exposure step of pattern exposing the core material layer in a predetermined core-forming shape to form a core by irradiating the core material layer on a side covered with the high refractive index substance with exposure light inclined at a predetermined angle with respect to the cladding layer surface; a high refractive index substance removing step of removing the high refractive index substance from the surface of the core material layer exposed in the exposure step; and a development step of developing the core material layer from which the high refractive index substance has been removed in the high refractive index substance removing step so as to form the core having an inclined endface.

The optical waveguide manufacturing method of the invention is a method of manufacturing an optical waveguide having an optical waveguide core with an inclined endface, the method including: a core material layer forming step forming a core material layer formed of a photosensitive material on a surface of a first cladding layer that has been formed on a substrate; a high refractive index substance covering step of covering a surface of the core material layer with a substance having a refractive index higher than 1 by bringing the high refractive index substance into close contact with the core material layer surface; an exposure step of pattern exposing the core material layer in a predetermined core-forming shape to form a core by irradiating the core material layer on a side covered with the high refractive index substance with exposure light inclined at a predetermined angle with respect to the first cladding layer surface; a high refractive index substance removing step of removing the high refractive index substance from the surface of the core material layer exposed in the exposure step; a development step of developing the core material layer from which the high refractive index substance has been removed in the high refractive index substance removing step so as to form the core having an inclined endface; and a cladding layer forming step of forming a second cladding layer in such a way as to bury the core.

The optical waveguide of the invention is obtained by this optical waveguide manufacturing method.

The optoelectric composite wiring board of the invention has the foregoing optical waveguide.

The objects, features, aspects and advantages are clearly explained by the following detailed description and the attached figures.

DESCRIPTION OF EMBODIMENTS

Embodiments of the invention are described below, although the invention is not limited by these embodiments.

One embodiment of the present method of manufacturing an optical waveguide core includes the steps of, in order: forming a core material layer composed of a photosensitive material on a surface of a cladding layer that has been formed on a substrate; covering a surface of the core material layer with a substance having a refractive index higher than 1 by bringing the high refractive index substance into close contact with the core material layer surface; pattern exposing the core material layer in a predetermined core-forming shape by irradiating the core material layer from a high refractive index substance-covered side thereof with exposure light inclined at a predetermined angle with respect to the cladding layer surface; removing the high refractive index substance from the surface of the exposed core material layer; and developing the core material layer from which the high refractive index substance has been removed so as to form a core having an inclined endface. The inventive method of manufacturing an optical waveguide includes, in addition to the steps of the foregoing optical waveguide core manufacture method, the step of forming a second cladding layer in such a way as to bury the core.

First Embodiment

FIG. 1 shows simplified diagrams depicting a method of manufacturing an optical waveguide according to a first embodiment of the present invention. FIG. 1A is a simplified cross-sectional showing the exposure step in the first embodiment; FIG. 1B is a simplified cross-sectional view showing the development step in the first embodiment; FIG. 1C is a simplified cross-sectional view showing the optical waveguide that has been formed; and FIG. 1D, which is a simplified view illustrating the direction of travel by the exposure light in the exposure step in the first embodiment, is an enlarged view of the region shown in the ellipse A in FIG. 1A.

Figure 1A:
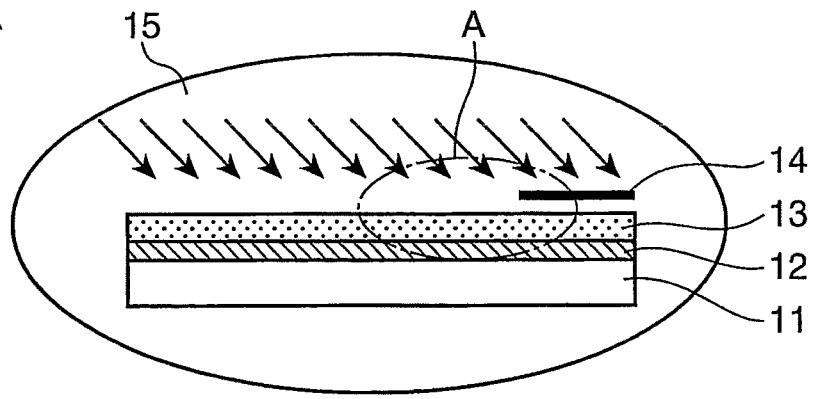
FIGS. 1A to 1D show simplified diagrams depicting a method of manufacturing an optical waveguide according to a first embodiment of the present invention.

The method of manufacturing an optical waveguide according to the first embodiment of the present invention entails, as shown in FIG. 1A, after forming a core material layer 13 on the first cladding layer 12 of a substrate 11 having a first cladding layer 12 thereon, exposing to light the core material layer 13 subsequently covered with a high refractive index substance 15.

Describing this in greater detail, to begin with, a first cladding layer 12 is formed on the surface of a substrate 11.

Any of various types of organic substrates or inorganic substrates may be used without particular limitation as the substrate 11. Illustrative examples of organic substrates include epoxy substrates, acrylic substrates, polycarbonate substrates and polyimide substrates. Illustrative examples of inorganic substrates include silicon substrates and glass substrates. Alternatively, use may be made of a printed circuit board having a circuit already formed on a substrate.

The method of forming the first cladding layer 12 may be, for example, a method wherein a resin film composed of a curable resin material having a specific refractive index for forming the first cladding layer 12 is attached to the surface of the substrate 11, then cured; a method wherein a liquid curable resin material for forming the first cladding layer 12 is coated onto the surface of the substrate 11, then cured; or a method wherein a varnish of a curable resin material for forming the first cladding layer 12 is coated onto the surface of the substrate 11, then cured. To increase adhesion when the first cladding layer 12 is formed, it is preferable to subject the surface of the substrate 11 to plasma treatment or the like beforehand.

The curable resin material for forming the first cladding layer 12 may be a material having a lower refractive index at the propagation wavelength of the guided light than the material of the subsequently formed core 16. The refractive index at this propagation wavelength is exemplified by a refractive index of from about 1.5 to about 1.55. Examples of such curable resin materials include epoxy resins, acrylic resins, polycarbonate resins and polyimide resins having the above refractive index.

The thickness of the first cladding layer 12 is preferably from about 5 to about 15 μm.

Specific methods that may be used to form the first cladding layer 12 include, for example, a method in which a resin film for forming the first cladding layer 12 is attached to the surface of the substrate 11, then cured; and another method to form the first cladding layer 12 is a method in which a liquid curable resin material or a varnish of a curable resin material is coated onto the surface of the substrate 11, then cured.

For example, the following method may be used to attach a resin film for forming the first cladding layer 12 to the surface of the substrate 11, then cure. First, a resin film made of a curable resin is placed over the surface of the substrate 11, then is attached thereto by pressing under applied heat; or a resin film made of a curable resin is attached to the surface of the substrate 11 by means of a clear adhesive. Following that, the attached resin film is cured by irradiation with light or by heating.

An example of a specific method that may be used for coating, then curing, a liquid curable resin material or a curable resin material varnish for forming the first cladding layer 12 is the following. First, a liquid curable resin material or a curable resin material varnish is coated onto the surface of the substrate 11 by using, e.g., a spin coating, bar coating or dip coating process. The liquid curable resin material or curable resin material varnish that has been applied is then cured by irradiation with light or by heating.

Next, as shown in FIG. 1A, a core material layer 13 composed of a photosensitive material is formed on an outer surface of the first cladding layer 12 that has been formed.

The method of forming the core material layer 13 may be, for example, a method wherein a resin film (photosensitive film) composed of a photosensitive polymer material having a specific refractive index for forming the core material layer 13 is attached to the outer surface of the first cladding layer 12; a method wherein a liquid photosensitive polymer material for forming the core material layer 13 is coated onto the outer surface of the first cladding layer 12; or a method wherein a varnish of a photosensitive polymer material for forming the core material layer 13 is coated onto the outer surface of the first cladding layer 12 then dried. To activate the outer surface of the first cladding layer 12 and increase adhesion thereto when the core material layer 13 is formed, it is preferable to subject the outer surface of the first cladding layer 12 to plasma treatment or the like beforehand.

As used herein, "photosensitive" refers to the quality of undergoing modification when irradiated with light. Examples of modification include curing, softening, a change in solubility with respect to a specific solvent, and a change in refractive index. The light (exposure light) is exemplified by, but not limited to, energy rays such as ultraviolet light. Depending on the material properties of the core material layer 13, light of other wavelengths may be used.

The resin film (photosensitive film) composed of such a photosensitive polymer material is exemplified by a dry film obtained by coating a polyethylene terephthalate (PET) film with a photosensitive polymer material in a semi-cured state. Such a dry film is generally protected by a protective film.

The photosensitive polymer material for forming the core material layer 13 may be one having a higher refractive index at the propagation wavelength of the guided light than the material of the first cladding layer 12. The refractive index at the propagation wavelength may be, for example, from about 1.55 to about 1.6.

The type of photosensitive polymer material for forming the core material layer 13 is exemplified by photosensitive materials containing as the resin component an epoxy resin, acrylic resin, polycarbonate resin or polyimide resin having a refractive index like that indicated above. Of these, a bisphenol-type epoxy resin is especially preferred. The photosensitive polymer material for forming the core material layer 13 is preferably a resin composition containing a bisphenol-type epoxy resin and a photocationic curing agent, the reason being that such a resin composition enables a waveguide having a high heat resistance to be obtained, thus making it possible to form a composite of the waveguide with a printed circuit board or the like. Moreover, from the standpoint of adhesion between the core material layer 13 and the first cladding layer 12, it is preferable that the photosensitive polymer material for forming the core material layer 13 be a system of the same type as the curable resin material for forming the first cladding layer 12.

The core material layer 13 has a thickness which, although not subject to any particular limitation, is preferably from about 20 to about 100 μm.

Examples of methods for forming the core material layer 13 that may be used include a method in which a resin film is attached so as to form the core material layer 13, and a method in which a liquid curable resin material or a curable resin material varnish is coated so as to form the core material layer 13.

Specific methods of attaching a resin film so as to form the core material layer 13 include placing a resin film composed of a curable resin over the outer surface of the first cladding layer 12, then attaching the resin film thereto by pressing under applied heat; or attaching a resin film made of a curable resin to the outer surface of the first cladding layer 12 by means of a clear adhesive.

Specific examples of methods for coating a liquid curable resin material for forming the core material layer 13 or a curable resin material varnish include coating the liquid curable resin material or the curable resin material onto the outer surface of the first cladding layer 12 by a spin coating, bar coating or dip coating process, then drying if necessary.

The core material layer 13 may be subjected to heat treatment before the core material layer 13 is, for example, selectively exposed and cured. In this way, the surface of the core material layer 13 may be rid of irregularities, bubbles, voids and the like, and thereby rendered smooth. The heat treatment temperature is preferably a temperature which imparts the core material layer 13 with a viscosity such as will rid the surface of irregularities, bubbles, voids, etc. and render it smooth, and is suitably selected according to the type of curable resin material that forms the core material layer 13. To fully achieve the above effects, it is preferable for the heat treatment time to be from about 10 to about 30 minutes. The means of heat treatment is not subject to any particular limitation. For example, use may be made of a method involving treatment in an oven set to a given temperature, or heating on a hot plate.

Next, as shown in FIG. 1A, after covering the surface of the core material layer 13 by bringing a substance having a refractive index higher than 1 into close contact therewith, pattern exposure in a predetermined shape is carried out on the core material layer 13 by irradiating the core material layer 13 with exposure light through a photomask 14. The exposure here, as shown in FIG. 1D, is not carried out by irradiating the exposure light from a direction perpendicular to the surface of the first cladding layer 12; rather, it involves inclined exposure in which the exposure light is irradiated obliquely such that the angle θ1 between a direction perpendicular to the surface of the first cladding layer 12 and the direction of travel by the exposure light passing through the core material layer 13 becomes a specific angle, e.g., 45° when forming a 45° mirror. More specifically, the exposure light is irradiated obliquely such that the angle θ0 of the exposure light with respect to a direction perpendicular to the surface of the first cladding layer 12, and the angle θ1, become specific angles.

When the core material layer 13 is exposed, such exposure is carried out with the surface of the core material layer 13 in a state covered by a high refractive index substance having a refractive index greater than 1 in such a way that the high refractive index substance is in close contact with the core material layer 13. This arrangement keeps the exposure light from not completely reflected at the surface of the core material layer 13, thereby increasing the range in the angle at which the exposure light enters the core material layer 13.

This is described more fully below.

Letting the refractive index of the high refractive index substance 15 which is present on the exposure light entry side surface of the core material layer 13 be n0 and letting the refractive index of the core material layer 13 be n1, the following Formula (1) holds when the exposure light enters the core material layer 13.

$$n0 \sin \theta 0 = n1 \sin \theta 1 \quad (1)$$

Letting n0 be 1.33, the conditions for entry of the exposure light into the core material layer 13 are given by Formula (2) below.

$$0 \leq \theta 1 \leq \sin^{-1}(1.33/n1) \quad (2)$$

Letting n1 be from 1.4 to 1.6, the conditions for entry of the exposure light into the core material layer 13 are given by Formula (3) below.

$$0 \leq \theta 1 \text{ approx. } 56 \text{ to } 72° \quad (3)$$

By contrast, in cases where the core material layer 13 is not covered by the high refractive index substance 15, when air is present on the exposure light entry side surface of the core material layer 13, assuming n0 to be 1 and n1 to be from 1.4 to 1.6, the conditions for entry of the exposure light into the core material layer 13 are given by Formula (4) below.

$$0 \leq \theta 1 \leq \text{approx. } 37 \text{ to } 46° \quad (4)$$

As described above, when exposure is carried out with the core material layer 13 covered by a high refractive index substance 15 having a refractive index higher than 1, the exposure light is not completely reflected at the surface of the core material layer 13, thereby increasing the range in the angle at which the exposure light enters the core material layer 13. As a result, the exposure light can be made to pass through the core material layer at a specific angle, such as 45°, with respect to a direction perpendicular to the surface of the cladding layer 13. In cases where exposure is carried out in air, for example, rather than in a state where the core material layer 13 is covered with a high refractive index substance 15 having a refractive index higher than 1, it may be impossible to form, for example, an inclined endface for a mirror at a predetermined angle of, for instance, 45° unless the refractive index n1 of the core material layer 13 is adjusted. Also, even assuming that it is possible to adjust the refractive index n1 of the core material layer and form an inclined endface, the smoothness of the surface of the inclined endface will tend to decline. This is presumably due to the fact that, even if the exposure light is able to enter the core material layer, the exposure light that is reflected increases, resulting in insufficient exposure.

From the above, by carrying out exposure in a state where the surface of the cover material layer 13 has been covered with a high refractive index substance having a refractive index greater than 1 in such a way as to bring the high refractive index substance into close contact with the core material layer 13, exposure for manufacturing an optical waveguide core having an inclined endface of a specific angle, such as an inclined endface for a 45° mirror, can be easily carried out. In addition, a smooth inclined endface can be obtained. This is presumably due to the fact that sufficient exposure light is able to enter the core material layer.

Any suitable substance which does not erode the core material layer 13, such as by, for example, reacting with the core material layer 13 or dissolving the core material layer 13, may be used without particular limitation as the high refractive index substance 15. Illustrative examples include liquids having a refractive index higher than 1, and structures of the sort described subsequently which have a face that is inclined to the surface of the first cladding layer 12 (resin films having a refractive index higher than 1).

Methods that may be used to cover the high refractive index substance 15 include, for example, a method in which the core material layer 13 that has been formed on the surface of the underlying cladding layer 12 is immersed in a liquid having a refractive index higher than 1, and a method in which a liquid having a refractive index higher than 1 is coated onto the core material layer 13.

The refractive index of the high refractive index substance 15 differs from the refractive index of the core material layer 13 by preferably not more than 0.3. If the difference between the refractive index of the high refractive index substance 15 and the refractive index of the core material layer 13 is too large, a sufficient exposure light entry angle range increasing effect will not be achieved.

The high refractive index substance 15 must cover the core material layer 13 in such a way as to be in close contact therewith. If, for example, a layer of air or the like is present between the core material layer 13 and the high refractive index substance 15, a sufficient exposure light entry angle range increasing effect will not be achieved. For this reason, it is preferable for the high refractive index substance 15 to be a liquid, illustrative examples of which include water, an alcohol such as ethanol, or an oil such as silicone oil.

In cases where a liquid is to be used as the high refractive index substance 15, a method wherein the core material layer 13 which has been formed on the surface of the underlying cladding layer 12 is immersed in a liquid having a refractive index greater than 1 can easily be carried out and is preferably used. In such a case, using the above-described photosensitive film (dry film) as the core material layer 13 is preferable in that erosion of the core material layer 13 can be suppressed.

The exposure is oblique exposure as described above, and is not subject to any particular limitation, provided use is made of a method involving exposure, at the required dose, to light of a wavelength capable of modifying (e.g., curing) the photosensitive material through a photomask 14. Alternatively, use may also be made of other exposure methods, such as contact exposure involving exposure after placing the photomask 14 in contact with the surface of the core material layer 13, or projection exposure held at a given spacing so as not to be in contact with the outer surface of the core material layer 13.

The exposure conditions are suitably selected according to the type of photosensitive material. For example, exposure conditions that include the use of UV light having a wavelength of about 365 nm as the exposure light, and an exposure dose of 500 to 2,500 mJ may be selected.

Following exposure, carrying out a post-cure by heating is effective for ensuring that curing is achieved. The post-cure conditions are preferably a temperature of from about 80 to about 160° C. and a time of from about 20 to about 120 minutes. However, this range is not subject to any particular limitation; what is important, of course, is that the post-cure conditions be optimized according to the photosensitive material.

After such exposure has been carried out, the high refractive index substance 15 is removed from the exposed core material layer 13. The method of removing the high refractive index substance 15 is not subject to any particular limitation. For example, in cases where the core material layer 13 was immersed in a liquid high refractive index material 15, an example of a suitable method is remove the workpiece having the core material layer 13 thereon from the liquid high refractive index substance 15 and wipe off or dry the liquid as needed. Alternatively, in cases where a resin film has been used as the high refractive index substance 15, the method of removal may involve, for example, peeling the resin film from the core material layer 13.

Figure 1B:
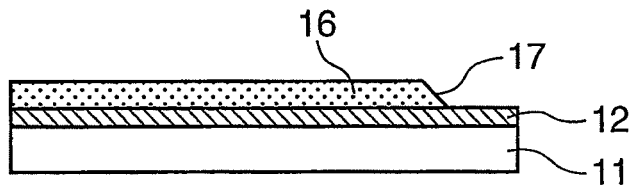

Next, as shown in FIG. 1B, a core 16 is formed by carrying out a development step. Because oblique exposure as described above is applied to the core 16, an inclined endface 17 is formed by carrying out ordinary development; that is, without carrying out special development.

Development is an operation in which unnecessary regions are removed by using a developer to wash away unexposed regions when the photosensitive material of the core material layer 13 is a positive-type material, or to wash away exposed regions when the photosensitive material is a negative material. Illustrative examples of the developer include acetone, isopropyl alcohol, toluene, ethylene glycol, or mixtures thereof in specific proportions. In addition, suitable use may also be made of aqueous developers such as those disclosed in Japanese Patent Application Laid-open No. 2007-292964. The development method is exemplified by methods wherein the developer is sprayed using a sprayer, and methods involving the use of ultrasonic washing.

The inclined endface 17 formed as described above may be used directly as a mirror. However, to increase the reflectance of the inclined endface 17, it is preferable to form a reflective coat composed of a metal, a dielectric multilayer film or the like on the surface of the inclined endface 17 by using a known process such as vapor deposition, sputtering or a nano-paste technique. By forming such a reflective coat, reflection in a specific direction that would be impossible in total reflection can be carried out.

The inclined endface 17 that has been formed as described above may be used directly as a mirror. Alternatively, the inclined endface 17 may be used after smoothing treatment has been applied to the surface thereof to increase the reflectance of the inclined endface 17. With such smoothing treatment, an inclined endface capable of being used as a mirror having a higher reflectance can be obtained. An example of smoothing treatment that may be advantageously used is a method in which the surface is fused by irradiating it with various types of energy rays, such as an infrared laser. Irradiation with energy rays involves an apparatus that is simple compared with a non-contact type, and is free of the variability associated with the manner of contact; in addition, by restricting the energy ray irradiation range, it is possible to treat only the inclined endface that is being targeted. Moreover, an infrared laser is easy to handle, yet is able to supply high-density energy. In particular, by inducing molecular vibrations at the irradiated surface, such a laser can efficiently thermally fuse the inclined endface. In a polymer, because absorption due to molecular vibrations generally occurs near a wavelength of 10 μm, a carbon dioxide laser having a wavelength near 10 μm is particularly effective, in addition to which the cost is low.

Aside from the above energy ray irradiation, it is also possible to increase the smoothness by coating a resin. The resin that may be used in such cases is of the same type as that used to form the core or cladding. Preferred use may be made of a resin of a closely proximate refractive index which has been diluted so as to be suitable for coating. In such a case, because the compatibility of the physical values (thermal expansion coefficient, etc.) with the underlying material is excellent and the refractive index is also similar, using such a resin does not diminish the optical properties. Also, by using a diluted resin, a good coatability can be maintained. Furthermore, because it is possible to coat only the minimum amount required, the inclined endface can be fully planarized.

Figure 1C:
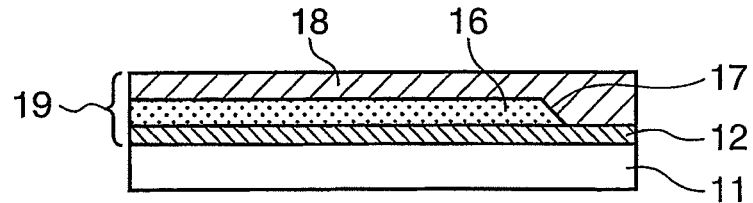
Figure 1D:
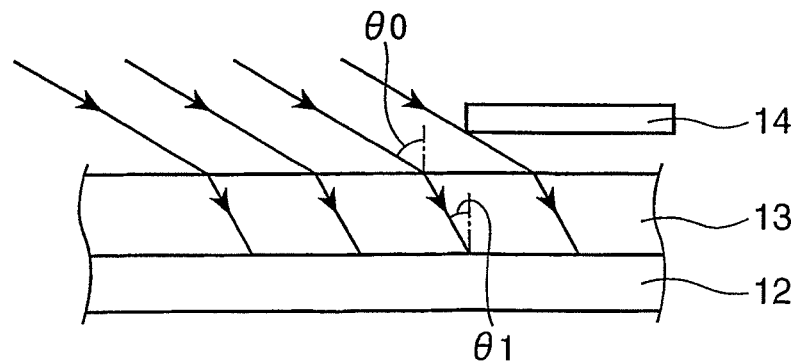

Finally, as shown in FIG. 1C, by forming a second cladding layer (overcladding layer) 18 in such a way as to bury the core 16 that has been formed in the development step, an optical waveguide 19 is formed.

Illustrative examples of the method of forming the second cladding layer 18 include a method in which a liquid curable resin material for forming the second cladding layer 18 is coated in such a way as to bury the core 16, then is cured with light, heat or the like; a method in which a varnish of curable resin material for forming the second cladding layer 18 is coated in such as way as to bury the core 16, then is cured with light, heat or the like; and a method in which a resin film made of a curable resin material for forming the second cladding layer 18 is attached in such a way as to bury the core 16, then is cured by light, heat or the like.

The curable resin material for forming the second cladding layer 18 is not subject to any particular limitation, provided it is a curable resin material having a refractive index at the propagation wavelength of the guided light which is lower than that of the material of which the core 16 is made. Generally, a curable resin material of a type similar to the material of which the first cladding layer 12 is formed may be used.

The thickness of the second cladding layer 18 is not subject to any particular limitation, although it is preferable for the thickness thereof on the core 16 to be of the same degree as that of the first cladding layer 12.

An optical waveguide 19 like that shown in FIG. 1C is thus formed by the above-described steps.

The optical waveguide 19 that has been formed is made up of a core 16 composed of a photosensitive material and cladding layers (the first cladding layer 12 and the second cladding layer 18) which cover the core. The core 16 has a higher refractive index than the cladding layers, and is thereby able to confine within the core by total reflection the light that propagates through the interior. Such an optical waveguide 19 is formed primarily as a multimode waveguide. It is appropriate, although not essential, for the core 16 in this optical waveguide 19 to have a rectangular shape with a size of, e.g., from 20 to 100 µm; for the thicknesses of the bottom first cladding layer 12 and the top second cladding layer 18, excluding the thickness of the layer that includes the core, to each be from 5 to 15 µm; and for the difference in refractive index between the core and the cladding layers to be from about 0.5% to about 3%.

Second Embodiment

Next, a case is described in which two kinds of light of different angles are used as the exposure light employed in the method of manufacturing an optical waveguide in the first embodiment of the invention. Features corresponding to those in the method of manufacturing an optical waveguide of the first embodiment of the invention are designated by the same reference symbols, and detailed explanations of the duplicate features are omitted.

Figure 2A:
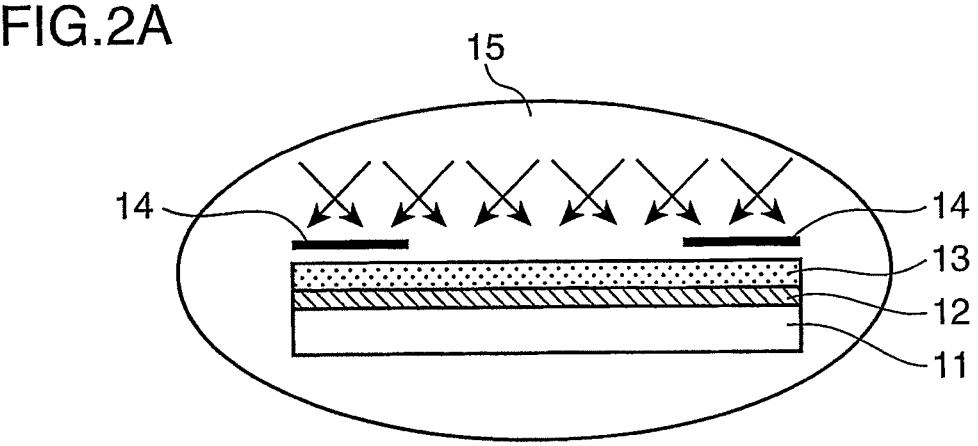
FIGS. 2A to 2C show simplified diagrams depicting a method of manufacturing an optical waveguide according to a second embodiment of the present invention.
Figure 2B:
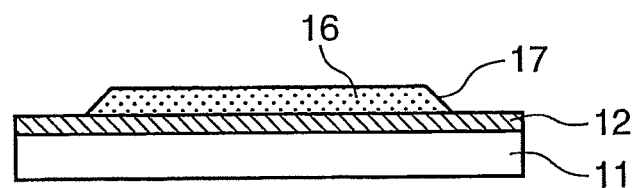
Figure 2C:
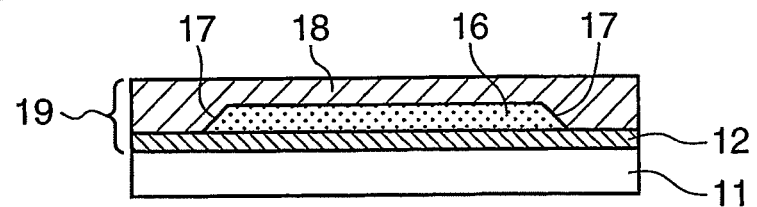

FIG. 2 shows simplified diagrams depicting a method of manufacturing an optical waveguide according to a second embodiment of the present invention. FIG. 2A is a simplified cross-sectional diagram showing the exposure step in the second embodiment; FIG. 2B is a simplified cross-sectional diagram showing the development step in the second embodiment; and FIG. 2C is a simplified cross-sectional diagram showing the optical waveguide that has been formed.

Same as in the first embodiment, the method of manufacturing an optical waveguide according to the second embodiment of the invention involves, as shown in FIG. 2A, after forming a core material layer 13 on the first cladding layer 12 of a substrate 11 having a first cladding layer 12 thereon, exposing to light the core material layer 13 in a state covered with a high refractive index substance 15.

More specifically, first, a first cladding layer 12 is formed on the surface of a substrate 11. Next, a core material layer 13 composed of a photosensitive material is formed on an outer surface of the first cladding layer 12 that has been formed.

Then, as shown in FIG. 2A, pattern exposure in a specific shape is carried out on the core material layer 3 by irradiating the core material layer 13 with exposure light through a photomask 14. Two kinds of light of different angles are used as the exposure light at this time. In this way, exposure for forming an optical waveguide core having two inclined endfaces of specific angles can be carried out.

Next, after the exposure step has been carried out, a core 16 like that shown in FIG. 2B is formed by carrying out a development step. Because oblique exposure as described above is applied to the core 16, two inclined endfaces 17 are formed by carrying out ordinary development; that is, without carrying out special development.

Finally, as shown in FIG. 2C, by forming a second cladding layer (overcladding layer) 18 in such a way as to bury the core 16 formed by the development step, an optical waveguide 19 is ultimately formed.

Third Embodiment

Next, a case is described in which the high reactive index substance used in the method of manufacturing an optical waveguide in the second embodiment of the invention is a structure having an inclined face with respect to the surface of the cladding layer, and the high refractive index substance covering step is a step in which the structure is brought into close contact with the core material layer. Features corresponding to those in the methods of manufacturing optical waveguides of the first and second embodiments of the invention are designated by the same reference symbols, and detailed explanations of the duplicate features are omitted.

FIG. 3 shows simplified diagrams depicting a method of manufacturing an optical waveguide according to a third embodiment of the present invention. FIG. 3A is a simplified cross-sectional diagram showing the high refractive index substance covering step in the third embodiment; FIG. 3B is a simplified cross-sectional diagram showing the exposure step in the third embodiment; FIG. 3C is a simplified cross-sectional diagram showing the development step in the third embodiment; and FIG. 3D is a simplified cross-sectional diagram showing the optical waveguide that has been formed.

Figure 3A:
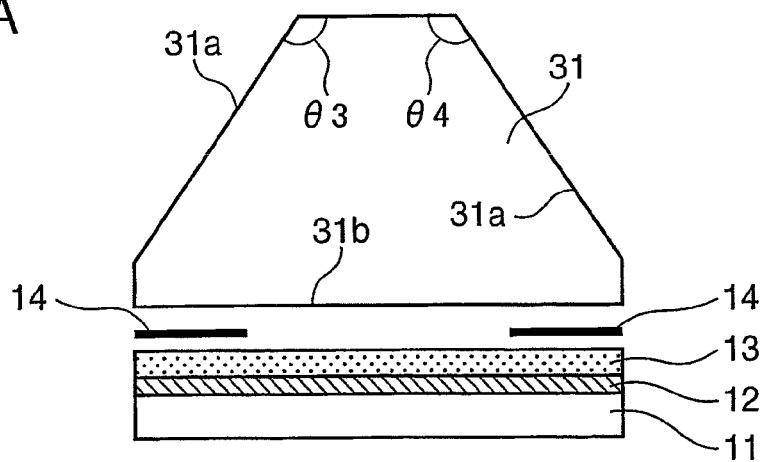
FIGS. 3A to 3D show simplified diagrams depicting a method of manufacturing an optical waveguide according to a third embodiment of the present invention.

The method of manufacturing an optical waveguide according to the third embodiment of the invention involves, as shown in FIG. 3A, forming a core material layer 13 on the first cladding layer 12 of a substrate 11 having a first cladding layer 12 thereon. Next, a high refractive index substance 31 is brought into close contact with the core material layer 13 in such a way as to cover the core material layer 13.

As shown in FIG. 3A, the high refractive index substance 31 here has not only a contact face 31b that is parallel to the core material layer 13 and is adapted for coming into close contact with the core material layer 13, but also has inclined faces 31a that are inclined with respect to the surface of the first cladding layer 12. The inclined faces 31a are faces where the exposure light is input to the high refractive index substance 31, and the contact face 31b is a face where the exposure light is output from the refractive index substance 31 and toward the core material layer 13. That is, the high refractive index substance 31 here is a structure having input faces 31a and an output face 31b.

The angles of inclination of the inclined faces 31a, defined as the angles θ3 and θ4 which they form with respect to the contact face 31b, are preferably angles such that the exposure light is substantially perpendicular to the input faces 31a. That is, it is preferable to use as the high refractive index substance 31a structure wherein the angles θ3 and θ4 are changed according to the angle of inclination of the exposure light. The structure used as the high refractive index substance 31 is not subject to any particular limitation, provided it is configured as described above. Illustrative examples include structures made of quartz and structures made of resin. It is desirable for the refractive index of the structure serving as the high refractive index substance 31 to have a difference with the refractive index of the core material layer 13 which is small, the difference therebetween preferably being not more than 0.3. As a result, in exposure where the exposure light is irradiated at the surface of the first cladding layer 12 from given angles of inclination, the exposure light enters the structure 31 through the inclined faces 31a, enabling reflection of the exposure light at the surface of the high refractive index substance 31 to be suppressed, and also enabling reflection at the surface of the core material layer 13 to be suppressed.

Figure 3B:
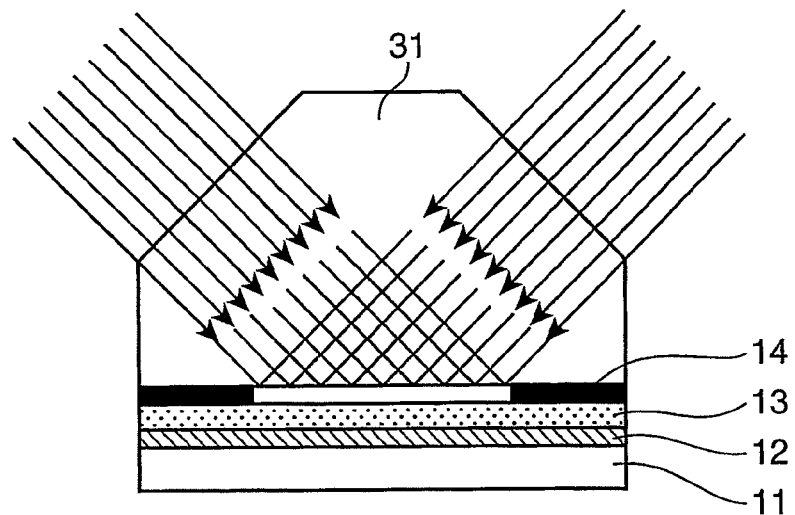

Next, as shown in FIG. 3B, pattern exposure in a specific shape is carried out on the core material layer 13 by exposure through the photomask 14 in a state covered with the high refractive index substance 15. It is preferable at this time to interpose a liquid substance having a high refractive index, such as water, both between the core material layer 13 and the photomask 14 and also between the photomask 14 and the high refractive index substance 31. This makes it possible to easily suppress the presence of air between the core material layer 13 and the photomask 14 and also between the photomask 14 and the high refractive index substance 31. As a result, an optical waveguide core having an inclined endface of a specific angle can be more efficiently manufactured. The method of interposing a liquid substance (water) having a high refractive index both between the core material layer 13 and the photomask 14 and between the photomask 14 and the high refractive index substance 31 is exemplified by a method in which the core material layer 13 is coated with water and the photomask 14 is placed thereon, then the photomask 14 is coated with water and the high refractive index substance 31 is placed thereon.

As shown in FIG. 3B, as in the second embodiment, two kinds of light of different angles are used as the exposure light. This makes it possible to carry out exposure for manufacturing an optical waveguide core having two inclined endfaces. When one kind of light is used, exposure for manufacturing an optical waveguide core having a single inclined endface can be carried out.

Figure 3C:
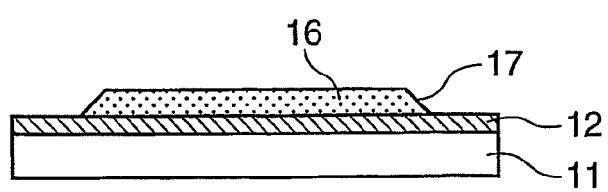

After the exposure step has been carried out, the core 16 is formed as shown in FIG. 3C by carrying out a development step. Because oblique exposure as described above is applied to the core 16, two inclined endfaces 17 are formed by carrying out ordinary development treatment; that is, without carrying out special development treatment.

Figure 3D:
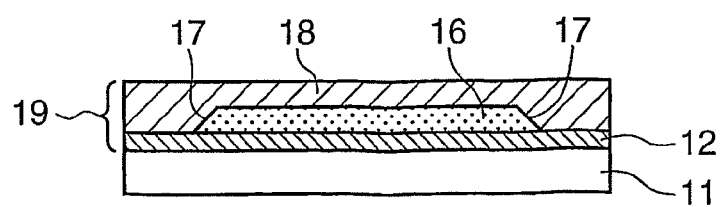

Then, as shown in FIG. 3D, a second cladding layer (overcladding layer) 18 is formed in such a way as to bury the core 16 that was formed in the development layer, thereby forming an optical waveguide 19.

In addition, an exposure device for use in exposure steps of pattern exposing in the first to third embodiments described above will be explained. Any exposure devices may be used as far as they have at least a function to change the relative-irradiation direction of energy ray against substrate. The change of relative-irradiation direction can be achieved, for example, by changing either the direction of energy ray itself or the inclination of the substrate. While exposing, it may needed to set out a position against the mask or to make the high refractive index material stick to the substrate. In the former case, the device is preferably equipped with a function to set out a position at least within 10 μm accuracy. In the latter case, the device is preferably equipped with a function to fix the substrate in liquid. It is also possible to make a solid high refractive index material stick to the substrate. In that case, the device is preferably equipped with functions to fix the substrate, to set out the position on the substrate automatically thereafter and to make the high refractive index material stick to the substrate. The device preferably has an irradiation power of about 5 to about 15 mW. Furthermore, the device is preferably equipped with multiple radiation ports of energy ray, so that multiple mirrors having different direction may be formed at the same time. A device having multiple radiation ports with different direction is exemplified by a device equipped with more than one flexible light guides.

The invention is described more fully below by way of working examples, although the scope of the invention is not limited whatsoever by these examples.

EXAMPLES

First, the method of producing the photocurable resin sheets used in the working examples is described.

Production of Undercladding Layer-Forming Photocurable Resin Sheet A

An epoxy resin varnish was prepared by dissolving 7 parts by weight of polypropylene glycol glycidyl ether (PG 207, available from Tohto Kasei Co., Ltd.), 25 parts by weight of a liquid hydrogenated bisphenol A-type epoxy resin (YX 8000, available from Japan Epoxy Resins Co., Ltd.), 20 parts by weight of a solid hydrogenated bisphenol A-type epoxy resin (YL 7170, available from Japan Epoxy Resins Co., Ltd.), 8 parts by weight of a 1,2-epoxy-4-(2-oxiranyl)cyclohexane addition product of 2,2-bis(hydroxymethyl)-1-butanol (EHPE 3150, available from Daicel Chemical Industries, Ltd.), 2 parts by weight of a solid bisphenol A-type epoxy resin (Epikote 1006FS, available from Japan Epoxy Resins Co., Ltd.), 20 parts by weight of a phenoxy resin (YP50, available from Tohto Kasei Co., Ltd.), 0.5 part by weight of a photocationic curing initiator (SP170, available from Adeka Corporation), 0.5 part by weight of a thermocationic curing initiator (SI-150L, available from Sanshin Chemical Industry Co., Ltd.) and 0.1 part by weight of a surface modifier (F470, available from DIC Corporation) in 30 parts by weight of toluene and 70 parts by weight of MEK as the solvents, filtering the solution with a membrane filter having pore size of 1 μm, then vacuum deaeration. This epoxy resin varnish was applied with a bar coater onto a PET film having a thickness of 50 μm, and subjected to 10 minutes of primary drying at 80° C., following by 10 minutes of secondary drying at 120° C. Finally, the dried varnish was covered with a 35 μm OPP film as a protective film. The undercladding layer-forming photocurable resin sheet A thus obtained had a film thickness of 10 μm and a refractive index for 579 nm wavelength light of 1.54.

Production of Core-Forming Photocurable Resin Sheet B

An epoxy resin varnish was prepared by dissolving 42 parts by weight of a liquid bisphenol A-type epoxy resin (Epiclon 850S, available from DIC Corporation), 55 parts by weight of a solid bisphenol A-type epoxy resin (Epikote 1006FS, available from Japan Epoxy Resins Co., Ltd.), 3 parts by weight of phenoxy resin (YP50, available from Tohto Kasei Co., Ltd.), 1 part by weight of a photocationic curing initiator (SP170, available from Adeka Corporation) and 0.1 part by weight of a surface modifier (F470, available from DIC Corporation) in 24 parts by weight of toluene and 56 parts by weight of MEK as the solvents, filtering the solution with a membrane filter having a pore size of 1 μm, then vacuum deaeration. This epoxy resin varnish was formed into a film in the same way as in "Production of Photocurable Resin Sheet A" described above. The core-forming photocurable resin sheet B obtained in this way had a film thickness of 40 μm and a refractive index for 579 nm wavelength light of 1.59. Moreover, this sheet B had a transmittance of 0.06 dB/cm at 850 nm, and thus a high transparency.

Production of Overcladding Layer-Forming Photocurable Resin Sheet C

Aside from changing the coating thickness of the epoxy resin varnish, an overcladding layer-forming photocurable resin sheet C was obtained by film formation in the same way as in "Production of Photocurable Resin Sheet A" described above. The photocurable resin sheet C obtained in this way had a film thickness of 50 μm and a refractive index for 579 nm wavelength light of 1.54.

Working Example 1

A method of manufacturing an optical waveguide is described in conjunction with FIG. 4. In FIG. 4, schematic diagrams are shown depicting the optical waveguide manufacturing method used in Working Example 1.

Figure 4A:
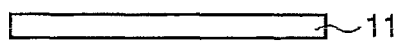
FIGS. 4A to 4J show schematic diagrams depicting the optical waveguide manufacturing method used in Working Example 1.
Figure 4B:
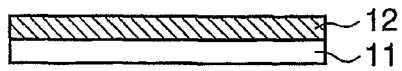

An undercladding layer-forming photocurable resin sheet A was laminated onto a 140 mm×120 mm temporary substrate (substrate) 11 like that shown in FIG. 4A composed of UV-transmitting polycarbonate resin. Lamination was carried out using a V-130 vacuum laminator at 60° C. and 0.2 MPa. Then, the surface of the photocurable resin sheet A was irradiated with UV light from an ultrahigh pressure mercury vapor lamp at an exposure dose of 2 J/cm², then heat treated for 30 minutes at 150° C., thereby forming an undercladding layer 12 like that shown in FIG. 4B. The surface of the undercladding layer 12 that had been formed was then subjected to oxygen plasma treatment.

Figure 4C:
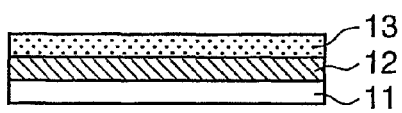

Next, as shown in FIG. 4C, a core-forming photocurable resin sheet B was laminated onto the surface of the undercladding layer 12 using a V-130 vacuum laminator at 60° C. and 0.2 MPa, thereby forming a core material layer 13.

Figure 4D:
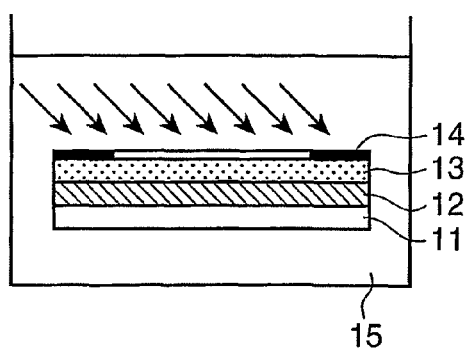

Next, as shown in FIG. 4D, a photomask 14 with a linear pattern of slits of 40 μm width and 120 mm length was placed thereon and positioned in such a way as to superimpose alignment marks on the photomask 14 over alignment marks formed on the surface of the core material layer 13, following which the resulting workpiece was immersed in this state within water (a high refractive index substance) 15. The portions of the core material layer 13 corresponding to the slits were then photocured with UV light at an exposure dose of 3 J/cm² from an ultrahigh pressure mercury vapor lamp adjusted so that the irradiated light was substantially parallel light. The substantially parallel light from the ultrahigh pressure mercury vapor lamp was irradiated so as to form an angle of 17° with respect to the core material layer 13 (resulting in an angle $\theta 0$ with respect to a direction perpendicular to the surface of the first cladding layer 12 of 73°).

Figure 4E:
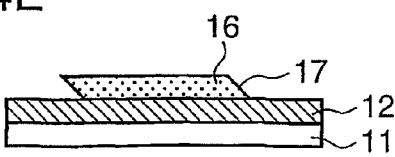

Two minutes of heat treatment at 140° C. was then carried out. Then, the unexposed portions (uncured portions) of the core material layer 13 were dissolved and removed by development using as the developer a water-based flux cleaner (Pinealpha ST-100SX, produced by Arakawa Chemical Industries, Ltd.) adjusted to 55° C. After a finish cleansing with water and air blowing, 10 minutes of drying at 100° C. was carried out, thereby forming a core 16 having an inclined endface 17 as shown in FIG. 4E. The angle of the inclined endface 17 with respect to the surface of the undercladding layer 12 was measured with a laser microscope, and found to be 38° (meaning that the angle formed with respect to a direction perpendicular to the surface of the first cladding layer 12 was 52°).

Figure 4F:
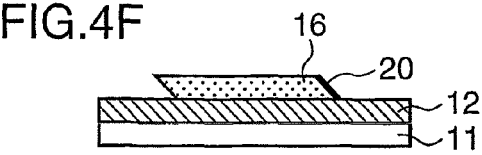

Next, as shown in FIG. 4F, a 1000 Å thickness of gold was vacuum deposited onto the surface of the inclined endface 17 through a metal mask having an opening only at the region where the inclined endface 17 had been formed, thereby giving a micromirror 20.

Figure 4G:
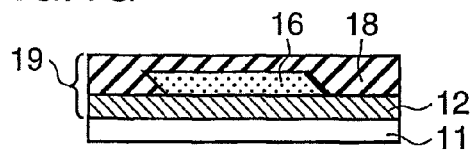

Next, as shown in FIG. 4G, an overcladding layer-forming photocurable resin sheet C was laminated using a V-130 vacuum laminator at 80° C. and 0.3 MPa so as to cover the undercladding layer 12 and the core 16.

Figure 4H:
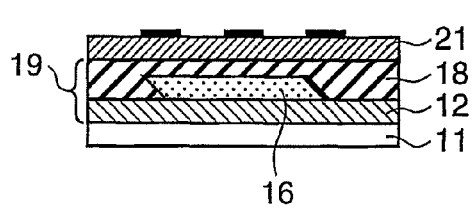

Then, as shown in FIG. 4H, a substrate 21 on which an electrical circuit had been pre-formed (a double-sided copper-clad laminate R1766, produced by Panasonic Electric Works Co., Ltd., one side of which was etched off and the other side of which had been formed into a circuit) was positioned on the surface of the overcladding layer-forming laminated photocurable resin sheet C and laminated thereto using a V-130 vacuum laminator. Exposure at a dose of 2 J/cm² with an ultrahigh pressure mercury vapor lamp was then carried out from the temporary substrate 11 side, followed by 1 hour of heat treatment at 140° C., thereby forming an overcladding layer 18 and bonding together the overcladding layer 18 and the substrate 21 on which an electrical circuit had been pre-formed. In this way, as shown in FIG. 4H, an optical waveguide 19 composed of an undercladding layer 12, a core 16 and an overcladding layer 18 was formed.

Figure 4I:
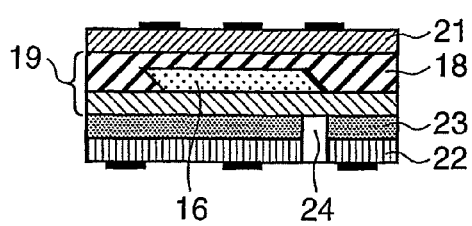
Figure 4J:
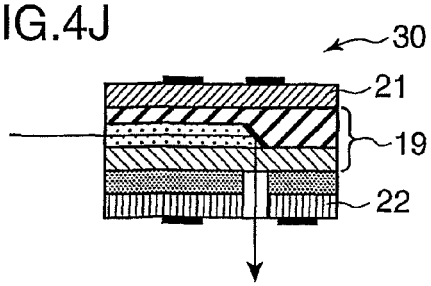

Next, as shown in FIG. 4I, the temporary substrate 11 was stripped off, following which a substrate 22 (a double-sided copper-clad laminate R1766, produced by Panasonic Electric Works Co., Ltd., one side of which had been etched off) was attached thereto by means of an adhesive layer 23. Then, a circuit having a predetermined pattern was formed by creating throughholes, then copper plating and etching. A solder resist was then formed, after which gold plating treatment and screen printing were carried out, thereby forming an electrical circuit. In addition, an optical input/output 24 was opened up by routing. Next, as shown in FIG. 4(J), the end of the workpiece on the side thereof where a micromirror 20 had not been formed was optically polished until the core 16 emerged, thereby giving an optoelectric composite wiring board 30. In this optoelectric composite wiring board 30, the path of the guided light which enters and leaves the optical waveguide 19 is indicated by the arrows shown in FIG. 4J.

The following evaluations were carried out on the optical waveguide thus formed.

Measurement of Waveguide Loss

The end of an optical fiber having a core diameter of 10 and a numerical aperture (NA) of 0.21 was connected through matching oil (silicone oil) to one end (input side end) of the optical waveguide. The end of an optical fiber having a core diameter of 200 μm and a NA of 0.4 was connected through matching oil to the other end (output side end) of the waveguide. Light from an LED light source was input to the optical waveguide 19 through the optical fiber connected to the input side end. The light leaving the optical waveguide 19 was input to a power meter through the optical fiber connected to the output side end, and the power P1 of the output light was measured.

In addition, the optical fiber connected to the input side end and the optical fiber connected to the output side end were directly connected to each other without the optical waveguide 19 therebetween, and the power P0 of the light output from the optical fiber connected to the output side end was measured in the same way as above.

The optical waveguide insertion loss L1 was determined from Formula (5) below, and the value obtained by dividing this insertion loss L1 by the optical waveguide length was calculated as the waveguide loss.

$$L1 = -10 \log(P1/P0) \tag{5}$$

Measurement of Mirror Loss

First, the insertion loss L1 was measured in the same way as when measuring the waveguide loss above. The micromirror portions were then cut off and the ends were polished, thereby forming a specimen in which the optical waveguide was exposed at both ends. This specimen having the optical waveguide exposed at both ends was then subjected to measurement of the insertion loss L2 for the optical waveguide alone in the same way as in the above-described waveguide loss measurement. The difference between L1 and L2 was treated as the mirror loss. In cases where there are two micromirrors—one at the input side and one at the output side, the mirror loss per micromirror was obtained by dividing the value obtained by two.

On carrying out the above measurements, the optical waveguide obtained in Working Example 1 was found to have a waveguide loss of 0.08 dB/cm and a mirror loss of 0.8 dB.

It was apparent from the above that when an optical waveguide is formed according to the present working example, an inclined endface for a mirror can be formed at the same time. That is, a low-loss optical waveguide having an inclined endface can be formed without requiring any operations other than the steps involved in forming the optical waveguide.

Working Example 2

A method of manufacturing an optoelectric composite wiring board is described in conjunction with FIG. 5. In FIG. 5, schematic diagrams are shown depicting the optical waveguide manufacturing method used in Working Example 2.

An electrical circuit 41 was formed by patterning the copper foil on one side of a flexible double-sided copper-clad laminate (FELIOS (R-F775), produced by Panasonic Electric Works Co., Ltd.) obtained by laminating 12 μm thick copper foil on each side of a 25 μm thick polyimide film. The entire surface of the copper foil on the other side of the laminate was removed by etching. In this way, a flexible printed circuit (FPC) having outside dimensions of 130 mm×130 mm like the FPC 40 shown in FIG. 5A was manufactured.

Figure 5A:
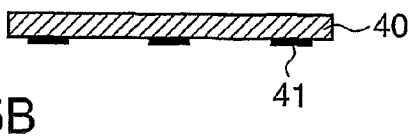
FIGS. 5A to 5K show schematic diagrams depicting the optical waveguide manufacturing method used in Working Example 2.
Figure 5B:
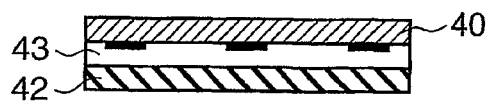

Next, as shown in FIG. 5B, a strong adhesive side of a removable double-sided adhesive tape 43 (No. 7692, available from Teraoka Seisakusho Co., Ltd.) was laminated onto the entire surface of a glass plate 42 (140 mm×140 mm×2 mm thick) using a compressed air injection-type vacuum laminator (V-130, manufactured by Nichigo-Morton Co., Ltd.) at 60° C. and 0.2 MPa. The side of the FPC 40 having the electrical circuit 41 formed thereon was then laminated to a weak adhesive side of the double-sided adhesive tape 43, thereby temporarily bonding the FPC 40 to the glass plate 42. Then, an undercladding layer-forming photocurable resin sheet A was laminated by means of the V-130 vacuum laminator onto the surface of the FPC 40 on the side where the electrical circuit 41 had not been formed.

Figure 5C:
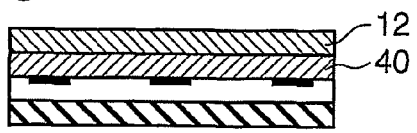

Next, the surface of the undercladding layer-forming photocurable resin sheet A was irradiated with UV light at an exposure dose of 2 J/cm$^2$ of UV light using an ultrahigh pressure mercury vapor lamp, then heat-treated at 150° C. for 30 minutes, thereby forming, as shown in FIG. 5C, an undercladding layer 12. The surface of the undercladding layer 12 thus formed was then subjected to oxygen plasma treatment.

Figure 5D:
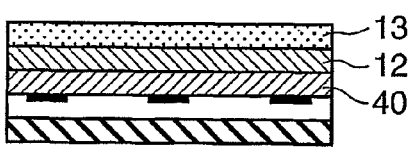

Next, as shown in FIG. 5D, a core-forming photocurable resin sheet B was laminated using the V-130 vacuum laminator onto the surface of the undercladding layer 12, thereby forming a core material layer 13.

Figure 5E:
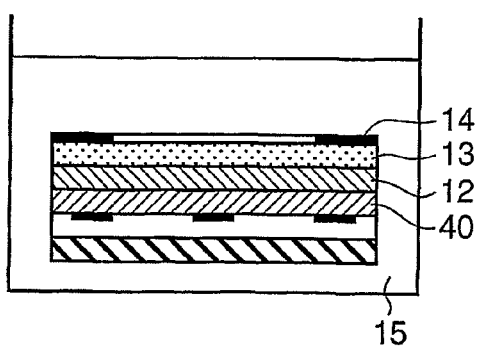

Next, as shown in FIG. 5E, a photomask 14 with a linear pattern of slits of 40 μm width and 120 mm length was placed thereon and positioned in such a way as to superimpose alignment marks on the photomask 14 over alignment marks formed on the surface of the core material layer 13, following which the resulting workpiece was immersed in this state within water 15.

Figure 5F:
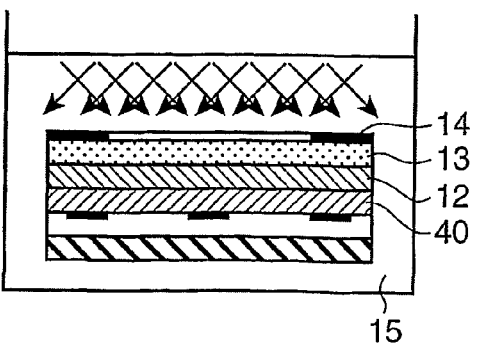

Then, as shown in FIG. 5F, the portions of the core material layer 13 corresponding to the slits were photocured with UV light at an exposure dose of 3 J/cm$^2$ from an ultrahigh pressure mercury vapor lamp adjusted so that the irradiated light was substantially parallel light. The substantially parallel light from the ultrahigh pressure mercury vapor lamp was light irradiated so as to form an angle of 32° with respect to the core material layer 13 (resulting in an angle θ0 with respect to a direction perpendicular to the surface of the first cladding layer 12 of 58°), and light irradiated so as to form an angle of −32° (resulting in an angle θ0 with respect to a direction perpendicular to the surface of the first cladding layer 12 of −58°).

Figure 5G:
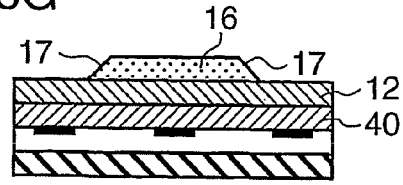

Two minutes of heat treatment at 140° C. was then carried out. The unexposed portions (uncured portions) of the core material layer 13 were subsequently dissolved and removed by development using as the developer a water-based flux cleaner (Pinealpha ST-100SX, produced by Arakawa Chemical Industries, Ltd.) adjusted to 55° C. After a finish cleansing with water and air blowing, 10 minutes of drying at 100° C. was carried out, thereby forming a core 16 having two inclined endfaces 17 as shown in FIG. 5G. The angles of the inclined endfaces 17 with respect to the surface of the undercladding layer 12 were measured with a laser microscope, and found to be 44° and −44°. The angles formed with respect to a direction perpendicular to the surface of the first cladding layer 12 were respectively 46° and −46°.

Figure 5H:
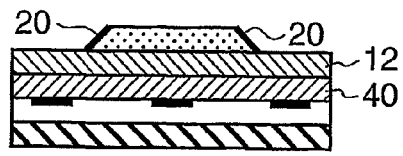

Next, as shown in FIG. 5H, a 1000 Å thickness of gold was vacuum deposited onto the surfaces of the inclined endfaces 17 through a metal mask with openings only at the regions where the inclined endfaces 17 were formed, thereby giving micromirrors 20.

Figure 5I:
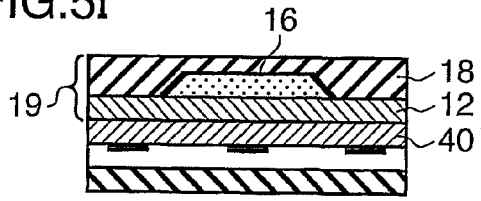

Next, as shown in FIG. 5I, an overcladding layer-forming photocurable resin sheet C was laminated using a V-130 vacuum laminator at 80° C. and 0.3 MPa so as to cover the undercladding layer 12 and the core 16. Then, after 30 minutes of heat treatment at 120° C., the laminated overcladding layer-forming photocurable resin sheet C was irradiated with UV light from an ultrahigh pressure mercury vapor lamp at an exposure dose of 2 J/cm$^2$ and again heat treated, this time for 30 minutes at 150° C., thereby forming an overcladding layer 18. The surface of the overcladding layer 18 thus formed was then subjected to oxygen plasma treatment.

Figure 5J:
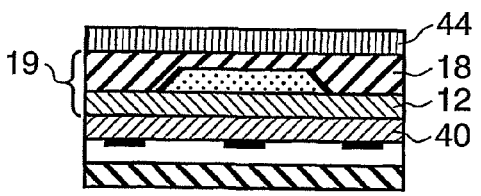

Then, as shown in FIG. 5J, a coverlay film 44 was laminated onto the surface of the overcladding layer 18 using a V-130 vacuum laminator at 120° C. and 0.3 MPa, following which it was heated at 160° C. for 1 hour and thereby cured. A polyimide film (Halogen-Free Coverlay Film R-CAES, produced by Panasonic Electric Works Co., Ltd.) having a thickness of 125 μm and including a 15 μm thick adhesive layer was used as the coverlay film 44.

Figure 5K:
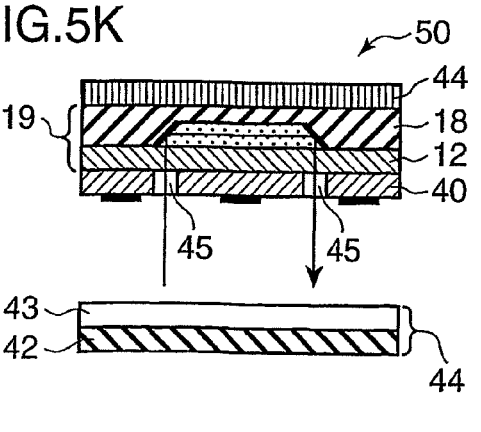

Next, as shown in FIG. 5K, the glass plate 42 was peeled off on the weak adhesive side of the double-sided pressure-sensitive adhesive tape 43, and an optical input/output 45 was opened up by routing, thereby giving an optoelectric composite wiring board 50 formed with the optical waveguide 19, with the core 16 being buried therein, in cladding layers composed of the undercladding layer 12 and the overcladding layer 18. In this optoelectric composite wiring board 50, the path of the guided light which enters and leaves the optical waveguide is indicated by the arrows shown in FIG. 5K.

The above-described tests were carried out on the optical waveguide obtained in Working Example 2, whereupon the waveguide loss was found to be 0.08 dB/cm and the mirror loss was found to be 0.7 dB.

It is apparent from the above that when an optical waveguide is formed according to the present working example, inclined endfaces for mirrors can be formed at the same time. That is, a low-loss optical waveguide having inclined endfaces can be formed without requiring any operations other than the steps involved in forming the optical waveguide.

Working Example 3

A method of manufacturing an optical waveguide is described in conjunction with FIG. 6. In FIG. 6, schematic diagrams are shown depicting the optical waveguide manufacturing method used in Working Example 3.

Figure 6A:
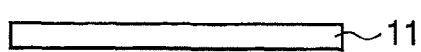
FIGS. 6A to 6G show schematic diagrams depicting the optical waveguide manufacturing method used in Working Example 3.

An undercladding layer-forming photocurable resin sheet A was laminated onto a 140 mm×120 mm temporary substrate 11 like that shown in FIG. 6A composed of UV-transmitting polycarbonate resin using a V-130 vacuum laminator at 60° C. and 0.2 MPa. Then, the surface of the photocurable resin sheet A was irradiated with UV light from an ultrahigh pressure mercury vapor lamp at an exposure dose of 2 J/cm$^2$, then heat treated for 30 minutes at 150° C., thereby forming an undercladding layer 12 like that shown in FIG. 6B. The surface of the undercladding layer 12 that had been formed was then subjected to oxygen plasma treatment.

Figure 6E:
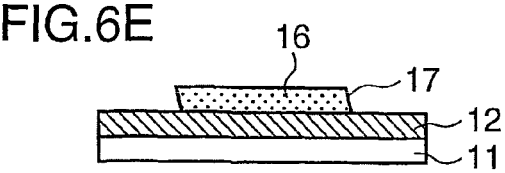
Figure 6B:
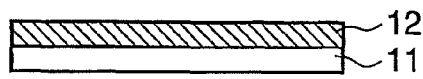
Figure 6F:
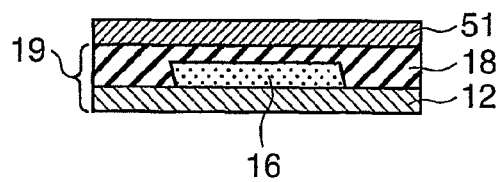
Figure 6C:
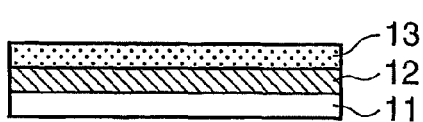

Next, as shown in FIG. 6C, a core-forming photocurable resin sheet B was laminated onto the surface of the undercladding layer 12 using a V-130 vacuum laminator at 60° C. and 0.2 MPa, thereby forming a core material layer 13.

Figure 6G:
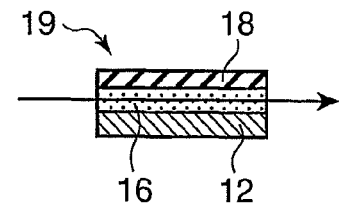
Figure 6D:
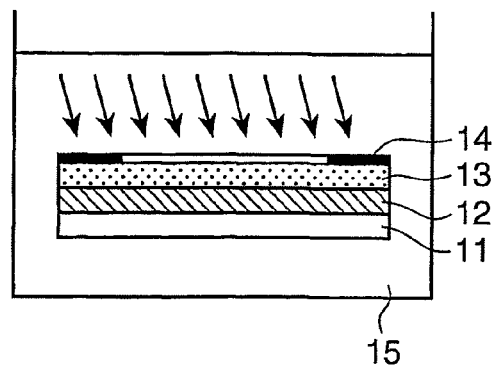

Then, as shown in FIG. 6D, a photomask 14 with a linear pattern of slits of 40 lam width and 120 mm length was placed thereon and positioned in such a way as to superimpose alignment marks on the photomask 14 over alignment marks formed on the surface of the core material layer 13, following which the resulting workpiece was immersed in this state within water 15. The portions of the core material layer 13 corresponding to the slits were then photocured with UV light at an exposure dose of 3 J/cm$^2$ from an ultrahigh pressure mercury vapor lamp adjusted so that the irradiated light was substantially parallel light. The substantially parallel light from the ultrahigh pressure mercury vapor lamp was irradiated so as to form an angle of 75° with respect to the core material layer 13 (resulting in an angle θ0 with respect to a direction perpendicular to the surface of the first cladding layer 12 of 15°).

Two minutes of heat treatment at 140° C. was then carried out. Next, the unexposed portions (uncured portions) of the core material layer 13 were dissolved and removed by development using as the developer a water-based flux cleaner (Pinealpha ST-100SX, produced by Arakawa Chemical Industries, Ltd.) adjusted to 55° C. After a finish cleansing with water and air blowing, 10 minutes of drying at 100° C. was carried out, thereby forming a core 16 having an inclined endface 17 as shown in FIG. 6E. The angle of the inclined endface 17 with respect to the surface of the undercladding layer 12 was measured with a laser microscope, and found to be 67° (meaning that the angle formed with respect to a direction perpendicular to the surface of the first cladding layer 12 was 13°).

Figure 8A:
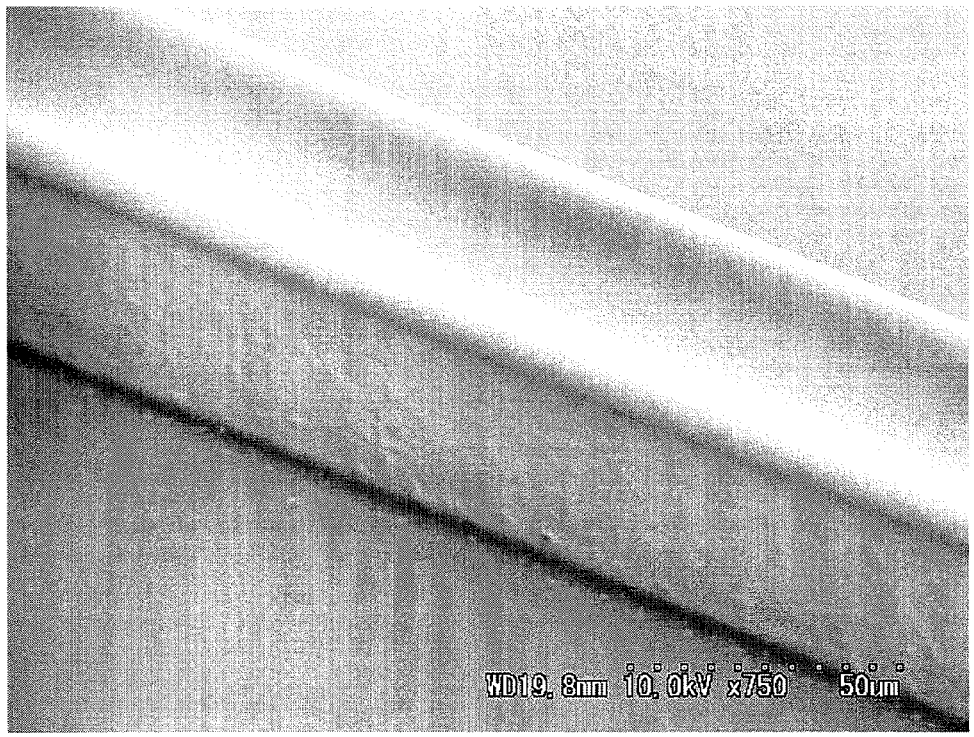
FIGS. 8A and 8B show scanning electron micrographs (SEM) obtained when using SEMs to examine the inclined endfaces of the optical waveguides obtained in Working Example 3 and the comparative example.

The inclined endface 17 of the core 16 thus formed was examined using a scanning electron microscope (SEM). The SEM image obtained at this time is shown in FIG. 8A.

Next, an overcladding layer-forming photocurable resin sheet C was laminated using a V-130 vacuum laminator at 80° C. and 0.3 MPa so as to cover the undercladding layer 12 and the core 16. Then, a substrate 51 on which an electrical circuit had been pre-formed (a double-sided copper-clad laminate R1766, produced by Panasonic Electric Works Co., Ltd., one side of which was etched off and the other side of which had been formed into a circuit) was positioned on the surface of the laminated, overcladding layer-forming photocurable resin sheet C and laminated thereto using a V-130 vacuum laminator. Exposure at a dose of 2 J/cm$^2$ with an ultrahigh pressure mercury vapor lamp was then carried out from the temporary substrate 11 side, followed by 1 hour of heat treatment at 140° C., thereby forming an overcladding layer 18 and bonding together the overcladding layer 18 and the substrate 51 on which an electrical circuit had been preformed. The temporary substrate 11 was then stripped off. In this way, as shown in FIG. 6F, an optical waveguide 19 composed of an undercladding layer 12, a core 16 and an overcladding layer 18 was formed.

Next, as shown in FIG. 6G, the endfaces on each side of the optical waveguide 19 were optically polished until the core 16 emerged. The path of the guided light which enters and leaves the optical waveguide 19 thus obtained is indicated by the arrows shown in FIG. 6G.

Comparative Example

A method of manufacturing an optical waveguide is described in conjunction with FIG. 7. In FIG. 7, schematic diagrams are shown depicting the optical waveguide manufacturing method used in the comparative example. Aside from carrying out light exposure in air, the comparative example is similar to Working Example 3. The details are given below.

Figure 7A:
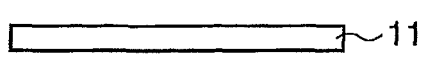
FIGS. 7A to 7G show schematic diagrams depicting the optical waveguide manufacturing method used in the comparative example.
Figure 7B:
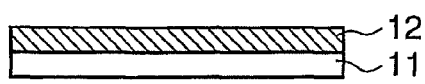

An undercladding layer-forming photocurable resin sheet A was laminated onto a 140 mm×120 mm temporary substrate 11 like that shown in FIG. 7A composed of UV-transmitting polycarbonate resin using a V-130 vacuum laminator at 60° C. and 0.2 MPa. Next, the surface of the photocurable resin sheet A was irradiated with UV light from an ultrahigh pressure mercury vapor lamp at an exposure dose of 2 J/cm$^2$, then heat-treated for 30 minutes at 150° C., thereby forming an undercladding layer 12 like that shown in FIG. 7B. The surface of the undercladding layer 12 that had been formed was then subjected to oxygen plasma treatment.

Figure 7C:
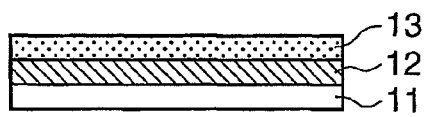

Next, as shown in FIG. 7C, a core-forming photocurable resin sheet B was laminated onto the surface of the undercladding layer 12 using a V-130 vacuum laminator at 60° C. and 0.2 MPa, thereby forming a core material layer 13.

Figure 7D:
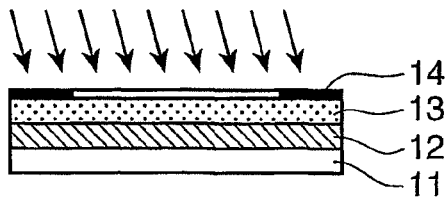

Then, as shown in FIG. 7D, a photomask 14 with a linear pattern of slits of 40 μm width and 120 mm length was placed thereon and positioned in such a way as to superimpose alignment marks on the photomask 14 over alignment marks formed on the surface of the core material layer 13. The portions of the core material layer 13 corresponding to the slits were then photocured with UV light at an exposure dose of 3 J/cm$^2$ from an ultrahigh pressure mercury vapor lamp adjusted so that the irradiated light was substantially parallel light. The substantially parallel light from the ultrahigh pressure mercury vapor lamp was irradiated so as to form an angle of 75° with respect to the core material layer 13 (resulting in an angle θ0 with respect to a direction perpendicular to the surface of the first cladding layer 12 of 15°).

Figure 7E:
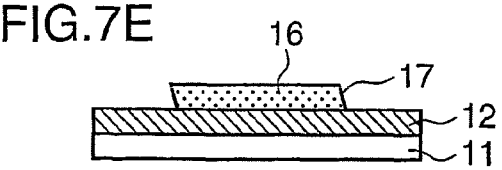

Two minutes of heat treatment at 140° C. was then carried out. Next, the unexposed portions (uncured portions) of the core material layer 13 were dissolved and removed by development using as the developer a water-based flux cleaner (Pinealpha ST-100SX, produced by Arakawa Chemical Industries, Ltd.) adjusted to 55° C. After a finish cleansing with water and air blowing, 10 minutes of drying at 100° C. was carried out, thereby forming a core 16 having an inclined endface 17 as shown in FIG. 7(E). The angle of the inclined endface 17 with respect to the surface of the undercladding layer 12 was measured with a laser microscope, and found to be 80° (meaning that the angle formed with respect to a direction perpendicular to the surface of the first cladding layer 12 was 10°).

Figure 8B:
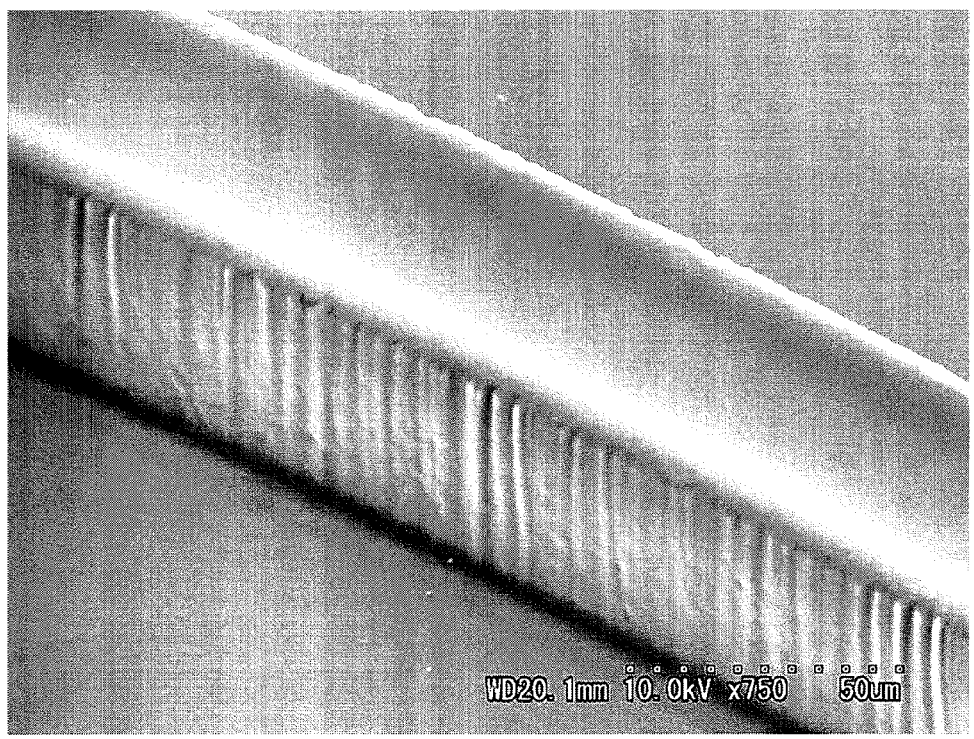

The inclined endface 17 of the core 16 thus formed was examined using a scanning electron microscope (SEM). The SEM image obtained at this time is shown in FIG. 8B.

Figure 7F:
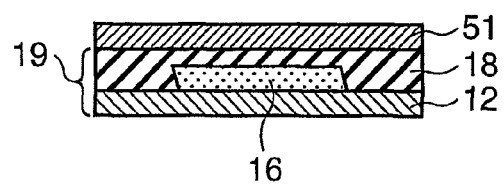

Next, an overcladding layer-forming photocurable resin sheet C was laminated using a V-130 vacuum laminator at 80° C. and 0.3 MPa so as to cover the undercladding layer 12 and the core 16. Then, a substrate 51 on which an electrical circuit had been pre-formed (a double-sided copper-clad laminate R1766, produced by Panasonic Electric Works Co., Ltd., one side of which was etched off and the other side of which had been formed into a circuit) was positioned on the surface of the laminated, overcladding layer-forming photocurable resin sheet C and laminated thereto using a V-130 vacuum laminator. Exposure at a dose of 2 J/cm$^2$ with an ultrahigh pressure mercury vapor lamp was then carried out from the temporary substrate 11 side, followed by 1 hour of heat treatment at 140° C., thereby forming an overcladding layer 18 and bonding together the overcladding layer 18 and the substrate 51 on which an electrical circuit had been pre-formed. The temporary substrate 11 was then stripped off. In this way, as shown in FIG. 7F, an optical waveguide 19 composed of an undercladding layer 12, a core 16 and an overcladding layer 18 was formed.

Figure 7G:
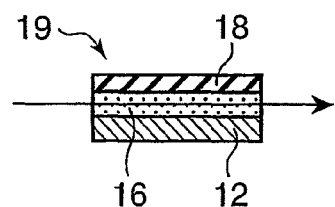

Next, as shown in FIG. 7G, the endfaces on each side of the optical waveguide 19 were optically polished until the core 16 emerged. The path of the guided light which enters and leaves the optical waveguide 19 thus obtained is indicated by the arrows shown in FIG. 7G.

When Working Example 3 was compared with this comparative example, even though the angle with respect to the core material layer 13 of the light irradiated during exposure was the same, the angle of the inclined endface 17 on the core 16 formed in Working Example 3 with respect to the surface of the undercladding layer 12 was larger. Because of this, it was found that exposure within water increases the range in the angle of the inclined endface 17 that can be formed with respect to the surface of the undercladding layer 12. In addition, as is apparent from FIG. 8, the inclined endface 17 of the core 16 that formed was found to be smoother in Working Example 3 than in the comparative example.

Moreover, when the waveguide loss was measured in each of the optical waveguides 19 obtained in Working Example 3 and in the comparative example, this was 0.08 dB/cm in Working Example and 0.15 dB/cm in the comparative example. It was thus apparent that the waveguide loss also improves when exposure is carried out in water.

Working Example 4

A method of manufacturing an optoelectric composite wiring board is described in conjunction with FIG. 9. In FIG. 9, schematic diagrams are shown depicting the optical waveguide manufacturing method used in Working Example 4.

An electrical circuit 41 was formed by patterning the copper foil on one side of a flexible double-sided copper-clad laminate (FELIOS(R-F775), produced by Panasonic Electric Works Co., Ltd.) obtained by laminating 12 µm thick copper foil on each side of a 25 µl thick polyimide film. The entire surface of the copper foil on the other side of the laminate was removed by etching. In this way, a flexible printed circuit (FPC) having outside dimensions of 130 mm×130 mm like the FPC 40 shown in FIG. 9A was manufactured.

Figure 9A:
FIGS. 9A to 9K show schematic diagrams depicting the optical waveguide manufacturing method used in Working Example 4.
Figure 9B:
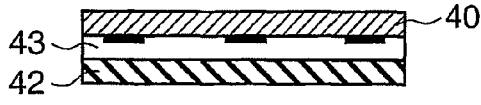

Next, as shown in FIG. 9B, a strong adhesive side of a removable double-sided adhesive tape 43 (No. 7692, available from Teraoka Seisakusho Co., Ltd.) was laminated onto the entire surface of a glass plate 42 (140 mm×140 mm×2 mm thick) using a compressed air injection-type vacuum laminator (V-130, manufactured by Nichigo-Morton Co., Ltd.) at 60° C. and 0.2 MPa. The side of the FPC 40 having the electrical circuit 41 formed thereon was then laminated to a weak adhesive side of the double-sided adhesive tape 43, thereby temporarily bonding the FPC 40 to the glass plate 42. Then, an undercladding layer-forming photocurable resin sheet A was laminated by means of the V-130 vacuum laminator onto the surface of the FPC 40 on the side where the electrical circuit 41 had not been formed.

Figure 9C:
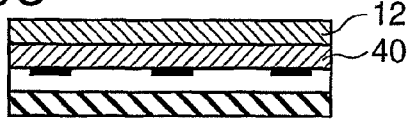

The surface of the undercladding layer-forming photocurable resin sheet A was subsequently irradiated with UV light at an exposure dose of 2 J/cm$^2$ of UV light using an ultrahigh pressure mercury vapor lamp, then heat-treated at 150° C. for 30 minutes, thereby forming, as shown in FIG. 9C, an undercladding layer 12. The surface of the undercladding layer 12 thus formed was then subjected to oxygen plasma treatment.

Figure 9D:
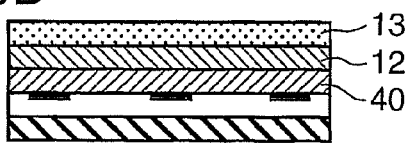

Next, as shown in FIG. 9D, a core-forming photocurable resin sheet B was laminated with the V-130 vacuum laminator onto the surface of the undercladding layer 12, thereby forming a core material layer 13.

Figure 9E:
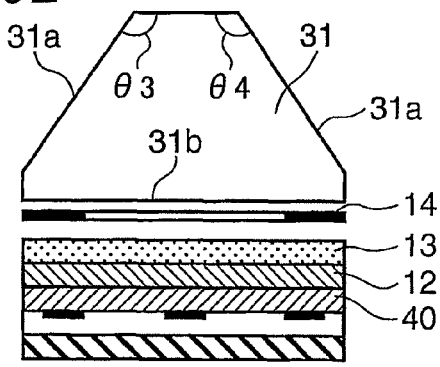

As shown in FIG. 9E, a photomask 14 and a structure 31 as the high refractive index substance were then placed in this order on the core material layer 13. Specifically, first water was coated onto the core material layer 13. Next, a photomask 14 with a linear pattern of slits of 40 µm width and 120 mm length was placed thereon and positioned in such a way as to superimpose alignment marks on the photomask 14 over alignment marks formed on the surface of the core material layer 13, following which water was coated onto the photomask 14. Then the structure 31 was placed on the water-coated photomask 14. The structure 31 used here was one that was composed of quartz glass having a refractive index of 1.46, and wherein the inclined faces had angles of inclination θ3 and θ4 of 139°.

Figure 9F:
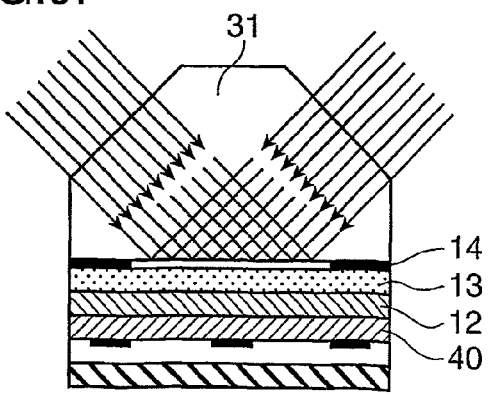

Then, as shown in FIG. 9F, UV light was irradiated so as to be substantially perpendicular to the inclined face of the structure 31 at an exposure dose of 3 J/cm$^2$ with an ultrahigh pressure mercury vapor lamp adjusted so that the irradiated light was substantially parallel light, thereby photocuring the portions of the core material layer 13 corresponding to the slits. The substantially parallel light from the ultrahigh pressure mercury vapor lamp was light irradiated so as to form an angle of 39° with respect to the core material layer 13 (resulting in an angle θ0 with respect to a direction perpendicular to the surface of the first cladding layer 12 of 51°), and light irradiated so as to form an angle of −39° (resulting in an angle θ0 with respect to a direction perpendicular to the surface of the first cladding layer 12 of −51°).

Figure 9G:
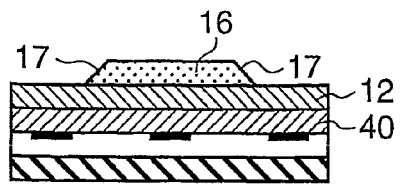

Two minutes of heat treatment at 140° C. was then carried out. The unexposed portions (uncured portions) of the core material layer 13 were subsequently dissolved and removed by development using as the developer a water-based flux cleaner (Pinealpha ST-100SX, produced by Arakawa Chemical Industries, Ltd.) adjusted to 55° C. After a finish cleansing with water and air blowing, 10 minutes of drying at 100° C. was carried out, thereby forming a core 16 having two inclined endfaces 17 as shown in FIG. 9(G). The angles of the inclined endfaces 17 with respect to the surface of the undercladding layer 12 were measured with a laser microscope and found to be 45° and −45°. The angles formed with respect to a direction perpendicular to the surface of the first cladding layer 12 were respectively 45° and −45°.

Figure 9H:
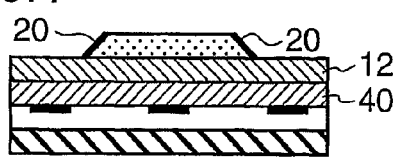

Next, as shown in FIG. 9H, a 1000 Å thickness of gold was vacuum deposited onto the surfaces of the inclined endfaces 17 through a metal mask with openings only at the regions where the inclined endfaces 17 were formed, thereby giving micromirrors 20.

Figure 9I:
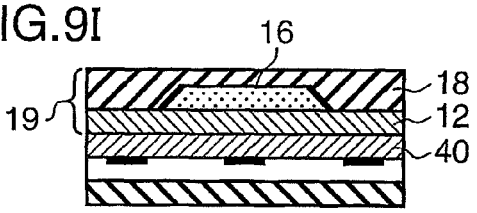

Then, as shown in FIG. 9I, an overcladding layer-forming photocurable resin sheet C was laminated using a V-130 vacuum laminator at 80° C. and 0.3 MPa so as to cover the undercladding layer 12 and the core 16. Then, after 30 minutes of heat treatment at 120° C., the laminated overcladding layer-forming photocurable resin sheet C was irradiated with UV light from an ultrahigh pressure mercury vapor lamp at an exposure dose of 2 J/cm$^2$ and again heat treated, this time for 30 minutes at 150° C., thereby forming an overcladding layer 18. The surface of the overcladding layer 18 thus formed was then subjected to oxygen plasma treatment.

Figure 9J:
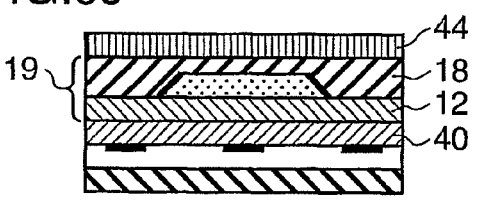

Next, as shown in FIG. 9J, a coverlay film 44 was laminated onto the surface of the overcladding layer 18 with a V-130 vacuum laminator at 120° C. and 0.3 MPa, following which it was heated at 160° C. for 1 hour and thereby cured. A polyimide film (Halogen-Free Coverlay Film R-CAES, produced by Panasonic Electric Works Co., Ltd.) having a thickness of 125 μm and including a 15 μm thick adhesive layer was used as the coverlay film 44.

Figure 9K:
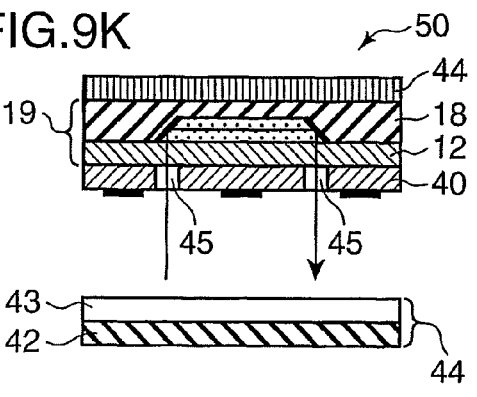

Then, as shown in FIG. 9K, the glass plate 42 was peeled off on the weak adhesive side of the double-sided pressure-sensitive adhesive tape 43, and an optical input/output 45 was opened up by routing, thereby giving an optoelectric composite wiring board 50 formed with the optical waveguide 19, with the core 16 being buried therein, in cladding layers composed of the undercladding layer 12 and the overcladding layer 18. In this optoelectric composite wiring board 50, the path of the guided light which enters and leaves the optical waveguide is indicated by the arrows shown in FIG. 9K.

The above-described tests were carried out on the optical waveguide obtained in Working Example 4, whereupon the waveguide loss was found to be 0.08 dB/cm and the mirror loss was found to be 0.6 dB.

It is apparent from the above that when an optical waveguide is formed according to the present working example, inclined endfaces for mirrors can be formed at the same time. That is, a low-loss optical waveguide having inclined endfaces can be formed without requiring any steps other than the steps involved in forming the optical waveguide.

As explained above, the optical waveguide core manufacturing method according to the invention is a method of manufacturing an optical waveguide core having an inclined endface, the method including: a core material layer forming step of forming a core material layer formed of a photosensitive material on a surface of a cladding layer that has been formed on a substrate; a high refractive index substance covering step of covering a surface of the core material layer with a substance having a refractive index higher than 1 by bringing the high refractive index substance into close contact with the core material layer surface; an exposure step of pattern exposing the core material layer in a predetermined core-forming shape to form a core by irradiating the core material layer on a side covered with the high refractive index substance with exposure light inclined at a predetermined angle with respect to the cladding layer surface; a high refractive index substance removing step of removing the high refractive index substance from the surface of the core material layer exposed in the exposure step; and a development step of developing the core material layer from which the high refractive index substance has been removed in the high refractive index substance removing step so as to form the core having an inclined endface.

In the manufacture of an optical waveguide core according to this inventive method, a core material layer composed of a photosensitive material is formed on a surface of a cladding layer, and a surface of the core material layer is covered by bringing a high refractive index substance into close contact therewith, following which the core material layer is pattern exposed in a predetermined core-forming shape by irradiating the core material layer on a side covered with the high refractive index substance with exposure light inclined at a predetermined angle with respect to the cladding layer surface. The high refractive index substance is then removed and development is carried out. In this way, an inclined endface having a predetermined angle is formed in the core at the same time that the core is formed.

Moreover, when exposure is carried out, because such exposure is carried out in a state where the core material layer surface has been covered by bringing the high refractive index substance into close contact therewith, the difference in refractive index between the core material layer and the high refractive index substance is smaller than the difference in refractive index between the core material layer and air. As a result, the exposure light is not fully reflected at the surface of the core material layer, and the range in the angle at which the exposure light enters the core material layer is broader. For this reason, the exposure light can be made to pass through the core material layer so as to achieve a predetermined angle, such as 45°, with respect to a direction perpendicular to the cladding layer surface, thus enabling the manufacture of an optical waveguide core having an inclined endface of a predetermined angle, such as an inclined endface for a 45° mirror. In addition, at the time of exposure, because the core material layer surface is covered by bringing the high refractive index substance into close contact therewith, no air or the like is present between the core material layer and the high refractive index substance, making it possible to fully achieve the above-mentioned effect of increasing the range in the angle at which the exposure light enters the core material layer.

For these reasons, an optical waveguide core having an inclined endface of a given angle can be efficiently manufactured.

The core material layer-forming step is preferably a step of attaching a photosensitive film made of the photosensitive material to the surface of the cladding layer. Such an arrangement makes it possible to easily carry out the core material layer-forming step, thus enabling an optical waveguide core having an inclined endface of a predetermined angle to be more efficiently manufactured.

In a preferred arrangement in which the core material layer-forming step uses the foregoing photosensitive film, the high refractive index substance is a liquid and the high refractive index substance covering step is a step of immersing the core material layer in the high refractive index substance. In such an arrangement, even when the high refractive index substance is a liquid, so long as the core material layer is a photosensitive film, erosion of the core material layer by the high refractive index material can be suppressed. Also, the presence of air between the core material layer and the high refractive index substance can easily be suppressed simply by immersing the core material layer in the high refractive index substance. As a result, an optical waveguide core having an inclined endface of a predetermined angle can be more efficiently manufactured.

In another preferred arrangement, the high refractive index substance is a structure having a face that is inclined with respect to the cladding layer surface, and the high refractive index substance covering step is a step of bringing the structure into close contact with the core material layer. With such an arrangement, in exposure by the irradiation of exposure light from a predetermined angle of inclination with respect to the cladding layer surface, the exposure light is made to enter the structure at the inclined face therein, enabling the reflection of exposure light at the surface of the high refractive index substance to be suppressed. Therefore, even when the refractive index of the high refractive index substance is increased and the difference in refractive index with the core material layer is made very small, exposure light appropriately enters the high refractive index substance. Moreover, reflection at the core material layer surface can be suppressed by making the difference in refractive index with the core material layer small.

The above enables an optical waveguide core having an inclined endface with a predetermined angle to be more efficiently manufactured.

It is also preferable for the exposure light to be formed of at least two kinds of light having different angles with respect to the cladding layer surface. This arrangement enables at least two inclined endfaces having different angles with respect to a direction perpendicular to the cladding layer surface to be formed.

It is also preferable for the photosensitive material to be a resin composition containing a bisphenol-type epoxy resin and a photocationic curing agent. In such an arrangement, the photosensitive material readily cures in the exposure step, thus making it possible to more efficiently manufacture an optical waveguide core having an inclined endface of a predetermined angle. Also, an optical waveguide core having a high heat resistance is manufactured, further facilitating the formation of a composite with a printed circuit board or the like.

Next, the optical waveguide manufacturing method of the invention is a method of manufacturing an optical waveguide having an optical waveguide core with an inclined endface, the method including: a core material layer forming step forming a core material layer formed of a photosensitive material on a surface of a first cladding layer that has been formed on a substrate; a high refractive index substance covering step of covering a surface of the core material layer with a substance having a refractive index higher than 1 by bringing the high refractive index substance into close contact with the core material layer surface; an exposure step of pattern exposing the core material layer in a predetermined core-forming shape to form a core by irradiating the core material layer on a side covered with the high refractive index substance with exposure light inclined at a predetermined angle with respect to the first cladding layer surface; a high refractive index substance removing step of removing the high refractive index substance from the surface of the core material layer exposed in the exposure step; a development step of developing the core material layer from which the high refractive index substance has been removed in the high refractive index substance removing step so as to form the core having an inclined endface; and a cladding layer forming step of forming a second cladding layer in such a way as to bury the core.

Such an arrangement makes it possible to efficiently manufacture an optical waveguide core having an inclined endface of a predetermined angle, which in turn makes it possible to efficiently manufacture an optical waveguide having such an optical waveguide core.

The optical waveguide of the invention is obtained by this optical waveguide manufacturing method. Such an optical waveguide has an optical waveguide core with an inclined endface of a predetermined angle, thus enabling an optical waveguide capable of light input and output to be obtained. An endface having a high degree of smoothness can be obtained as the inclined endface.

The optoelectric composite wiring board of the invention has the foregoing optical waveguide. Such an arrangement makes it possible to obtain an optoelectric composite wiring board with an optical waveguide, which optical waveguide, by having an optical waveguide core with an inclined endface of a predetermined angle, is capable of light input and output. Accordingly, an optoelectric composite wiring board having an optical waveguide and an electric circuit can be obtained.

INDUSTRIAL APPLICABILITY

The present invention provides a manufacturing method which is capable of efficiently manufacturing an optical waveguide core having an inclined endface of a predetermined angle. The invention further provides a method of manufacturing an optical waveguide having an optical waveguide core with an inclined endface, an optical waveguide manufacturing by such a manufacturing method, and an optoelectric composite wiring board having such an optical waveguide.

The invention claimed is:

1. A method of manufacturing an optical waveguide core having an inclined endface, the method comprising:
   forming a core material layer of a photosensitive material on a surface of a cladding layer that has been formed on a substrate;
   immersing the core material layer in a high refractive index liquid substance having a refractive index higher than 1 to thereby cover a surface of the core material layer with the high refractive index liquid substance, the core material layer being immersed such that a surface of the core material layer is parallel to a surface of the high refractive index liquid substance;
   pattern exposing the core material layer, in a predetermined core-forming shape to form a core by irradiating the core material layer on a side covered with the high refractive index liquid substance, and with at least two kinds of exposure light having different angles of inclination with respect to the cladding layer surface, and without moving the core material layer;
   removing the high refractive index liquid substance from the surface of the core material layer exposed in the pattern exposing; and
   developing the core material layer from which the high refractive index liquid substance has been removed so as to form the core having an inclined endface.

2. The method of manufacturing an optical waveguide core according to claim 1,
   wherein the forming the core material layer comprises attaching a photosensitive film made of the photosensitive material to the surface of the cladding layer.

3. The method of manufacturing an optical waveguide core according to claim 1,
   wherein the photosensitive material is a resin composition containing a bisphenol-type epoxy resin and a photocationic curing agent.

4. A method of manufacturing an optical waveguide having an optical waveguide core with an inclined endface, the method comprising:
   forming a core material layer of a photosensitive material on a surface of a first cladding layer that has been formed on a substrate;
   immersing the core material layer in a high refractive index liquid substance having a refractive index higher than 1 to thereby cover a surface of the core material layer with the high refractive index liquid substance, the core material layer being immersed such that a surface of the core material layer is parallel to a surface of the high refractive index liquid substance;
   pattern exposing the core material layer, in a predetermined core-forming shape to form a core by irradiating the core material layer on a side covered with the high refractive index liquid substance, and with at least two kinds of exposure light having different angles of inclination with respect to the first cladding layer surface, and without moving the core material layer;

removing the high refractive index liquid substance from the surface of the core material layer exposed in the pattern exposing;

developing the core material layer from which the high refractive index liquid substance has been removed so as to form the core having an inclined endface; and forming a second cladding layer so as to bury the core.

5. An optical waveguide obtained by the optical waveguide manufacturing method according to claim 4.

6. An optoelectric composite wiring board having the optical waveguide according to claim 5.

* * * * *